United States Patent
Vertegaal et al.

(10) Patent No.: US 10,296,084 B2
(45) Date of Patent: May 21, 2019

(54) METHOD AND APPARATUS FOR COMMUNICATION BETWEEN HUMANS AND DEVICES

(71) Applicant: Queen's University at Kingston, Kingston (CA)

(72) Inventors: Roel Vertegaal, Perth Road (CA); Jeffrey S. Shell, Etobicoke (CA)

(73) Assignee: Queen's University at Kingston, Kingston, Ontario (CA)

( * ) Notice: Subject to any disclaimer, the term of this patent is extended or adjusted under 35 U.S.C. 154(b) by 0 days.

(21) Appl. No.: 15/429,733

(22) Filed: Feb. 10, 2017

(65) Prior Publication Data

US 2017/0371407 A1    Dec. 28, 2017

Related U.S. Application Data

(63) Continuation of application No. 14/722,504, filed on May 27, 2015, now abandoned, which is a
(Continued)

(51) Int. Cl.
   *G06F 3/01* (2006.01)
   *G05B 23/02* (2006.01)
   *G06F 3/14* (2006.01)

(52) U.S. Cl.
   CPC ............. *G06F 3/013* (2013.01); *G05B 23/02* (2013.01); *G06F 3/011* (2013.01); *G06F 3/14* (2013.01)

(58) Field of Classification Search
   CPC ............... G06F 3/013; G02B 27/0093; G06T 2207/10024; G06T 2207/10152; G06T 2207/30041; G06K 9/00597; G06K 9/4661; G06K 9/00208; G06K 9/00221; G06K 9/00268

See application file for complete search history.

(56) References Cited

U.S. PATENT DOCUMENTS

| 4,169,663 A | 10/1979 | Murr |
| 4,302,011 A | 11/1981 | Pepper, Jr. |

(Continued)

FOREIGN PATENT DOCUMENTS

| EP | 0 816 980 A2 | 1/1998 |
| EP | 0991016 A2 | 4/2000 |

(Continued)

OTHER PUBLICATIONS

U.S. Appl. No. 14/210,778, Office Action.
(Continued)

*Primary Examiner* — Sanjiv D. Patel
(74) *Attorney, Agent, or Firm* — Stephen J. Scribner

(57) ABSTRACT

This invention relates to methods and apparatus for improving communications between humans and devices. The invention provides a method of modulating operation of a device, comprising: providing an attentive user interface for obtaining information about an attentive state of a user; and modulating operation of a device on the basis of the obtained information, wherein the operation that is modulated is initiated by the device. Preferably, the information about the user's attentive state is eye contact of the user with the device that is sensed by the attentive user interface.

22 Claims, 6 Drawing Sheets

Related U.S. Application Data continuation of application No. 14/210,778, filed on Mar. 14, 2014, now abandoned, which is a continuation of application No. 13/866,430, filed on Apr. 19, 2013, now Pat. No. 8,672,482, which is a continuation of application No. 13/315,844, filed on Dec. 9, 2011, now abandoned, which is a continuation of application No. 12/843,399, filed on Jul. 26, 2010, now Pat. No. 8,096,660, which is a continuation of application No. 10/392,960, filed on Mar. 21, 2003, now Pat. No. 7,762,665.

(56) References Cited

U.S. PATENT DOCUMENTS

| | | | |
|---|---|---|---|
| 4,595,990 A | 6/1986 | Garwin et al. | |
| 4,659,197 A | 4/1987 | Weinblatt | |
| 4,755,045 A | 7/1988 | Borah et al. | |
| 4,836,670 A * | 6/1989 | Hutchinson | A61B 3/113 |
| | | | 351/210 |
| 4,950,069 A | 8/1990 | Hutchinson | |
| 4,973,149 A | 11/1990 | Hutchinson | |
| 5,016,282 A * | 5/1991 | Tomono | G06F 3/013 |
| | | | 382/117 |
| 5,293,427 A | 3/1994 | Ueno et al. | |
| 5,325,133 A | 6/1994 | Adachi | |
| 5,335,276 A | 8/1994 | Thompson et al. | |
| 5,422,690 A | 6/1995 | Rothberg et al. | |
| 5,481,622 A | 1/1996 | Gerhardt et al. | |
| 5,649,061 A | 7/1997 | Smyth | |
| 5,689,241 A | 11/1997 | Clarke, Sr. et al. | |
| 5,689,619 A | 11/1997 | Smyth | |
| 5,731,805 A | 3/1998 | Tognazzini et al. | |
| 5,831,594 A | 11/1998 | Tognazzini et al. | |
| 5,835,083 A | 11/1998 | Nielsen | |
| 5,850,211 A | 12/1998 | Tognazzini | |
| 5,886,683 A | 3/1999 | Tognazzini et al. | |
| 5,898,423 A | 4/1999 | Tognazzini et al. | |
| 5,912,721 A * | 6/1999 | Yamaguchi | G06K 9/0061 |
| | | | 351/209 |
| 5,944,530 A | 8/1999 | Ho et al. | |
| 6,001,065 A | 12/1999 | DeVito | |
| 6,067,069 A | 5/2000 | Krause | |
| 6,078,310 A * | 6/2000 | Tognazzini | G06F 3/013 |
| | | | 345/158 |
| 6,092,058 A | 7/2000 | Smyth | |
| 6,147,612 A | 11/2000 | Ruan et al. | |
| 6,152,563 A | 11/2000 | Hutchinson et al. | |
| 6,158,432 A | 12/2000 | Biondi et al. | |
| 6,204,828 B1 | 3/2001 | Amir et al. | |
| 6,246,779 B1 | 6/2001 | Fukui et al. | |
| 6,282,553 B1 | 8/2001 | Flickner et al. | |
| 6,351,273 B1 | 2/2002 | Lemelson et al. | |
| 6,353,824 B1 | 3/2002 | Boguraev et al. | |
| 6,393,136 B1 * | 5/2002 | Amir | G06F 3/011 |
| | | | 348/14.01 |
| 6,397,137 B1 | 5/2002 | Alpert et al. | |
| 6,401,050 B1 | 6/2002 | Cooke et al. | |
| 6,421,064 B1 | 7/2002 | Lemelson et al. | |
| 6,424,376 B1 | 7/2002 | Hirasawa | |
| 6,437,758 B1 | 8/2002 | Nielsen et al. | |
| 6,456,262 B1 | 9/2002 | Bell | |
| 6,496,117 B2 | 12/2002 | Gutta et al. | |
| 6,526,159 B1 | 2/2003 | Nickerson | |
| 6,539,100 B1 * | 3/2003 | Amir | G06F 3/011 |
| | | | 382/117 |
| 6,577,329 B1 | 6/2003 | Flickner et al. | |
| 6,578,962 B1 | 6/2003 | Amir et al. | |
| 6,606,111 B1 | 8/2003 | Kondo et al. | |
| 6,608,615 B1 | 8/2003 | Martins | |
| 6,608,644 B1 | 8/2003 | Kondo | |
| 6,618,716 B1 | 9/2003 | Horvitz | |
| 6,634,749 B1 | 10/2003 | Morrison et al. | |
| 6,731,307 B1 | 5/2004 | Strubbe et al. | |
| 6,784,916 B2 | 8/2004 | Smith | |
| 6,803,887 B1 | 10/2004 | Lauper et al. | |
| 6,859,144 B2 | 2/2005 | Newman et al. | |
| 6,886,137 B2 | 4/2005 | Peck et al. | |
| 7,120,880 B1 | 10/2006 | Dryer et al. | |
| 7,124,374 B1 | 10/2006 | Haken | |
| 7,164,886 B2 | 1/2007 | Mowery et al. | |
| 7,289,102 B2 | 10/2007 | Hinckley et al. | |
| 7,302,280 B2 | 11/2007 | Hinckley et al. | |
| 7,382,395 B1 | 6/2008 | Saburi et al. | |
| 7,401,920 B1 | 7/2008 | Kranz et al. | |
| 7,536,704 B2 | 5/2009 | Pierre | |
| 7,554,541 B2 | 6/2009 | Fitzmaurice et al. | |
| 7,762,665 B2 | 7/2010 | Vertegaal et al. | |
| 7,908,617 B2 | 3/2011 | Kimura | |
| 8,096,660 B2 | 1/2012 | Vertegaal et al. | |
| 8,292,433 B2 | 10/2012 | Vertegaal et al. | |
| 8,322,856 B2 | 12/2012 | Vertegaal et al. | |
| 8,475,174 B2 | 7/2013 | Ho et al. | |
| 8,672,482 B2 | 3/2014 | Vertegaal et al. | |
| 2001/0015964 A1 | 8/2001 | Fuchisawa | |
| 2001/0028309 A1 | 10/2001 | Torch | |
| 2002/0024506 A1 | 2/2002 | Flack et al. | |
| 2002/0075286 A1 | 6/2002 | Yonezawa | |
| 2002/0102947 A1* | 8/2002 | Hofman | H04M 1/02 |
| | | | 455/550.1 |
| 2002/0105482 A1 | 8/2002 | Lemelson et al. | |
| 2002/0115050 A1 | 8/2002 | Roschelle et al. | |
| 2002/0116156 A1 | 8/2002 | Remboski et al. | |
| 2002/0135618 A1 | 9/2002 | Maes et al. | |
| 2002/0137552 A1 | 9/2002 | Cannon et al. | |
| 2002/0141614 A1 | 10/2002 | Lin | |
| 2002/0144259 A1 | 10/2002 | Gutta | |
| 2003/0038754 A1 | 2/2003 | Goldstein et al. | |
| 2003/0052911 A1 | 3/2003 | Cohen-solal | |
| 2003/0081834 A1 | 5/2003 | Philomin et al. | |
| 2003/0098954 A1* | 5/2003 | Amir | A61B 3/113 |
| | | | 351/210 |
| 2003/0123754 A1 | 7/2003 | Toyama | |
| 2004/0070666 A1 | 4/2004 | Bober et al. | |
| 2004/0203635 A1 | 10/2004 | Wen et al. | |
| 2012/0078623 A1 | 3/2012 | Vertegaal et al. | |
| 2013/0188032 A1 | 7/2013 | Vertegaal | |

FOREIGN PATENT DOCUMENTS

| | | |
|---|---|---|
| GB | 2 372 683 A | 8/2002 |
| JP | H09-34424 | 2/1997 |
| WO | WO 01/33323 | 5/2001 |
| WO | WO 01/69387 A2 | 9/2001 |
| WO | WO 03/079902 | 10/2003 |

OTHER PUBLICATIONS

U.S. Appl. No. 14/722,504, Office Action.

Bolt, R.A. "Gaze-Orchestrated Dynamic Windows". *Computer Graphics* 15(3): 109-119 (1981).

Chino, T., et al., "GazeToTalk: A Nonverbal Interface with Meta-Communication Facility". (*Poster Session*) p. 111 *In Proceedings of ACM ETRA* (2000).

Ebisawa, Y, "Improved video-based eye-gaze detection method" *IEEE Transactions on Instrumentation and Measurement* 47: 948-955 (1998).

Haro, A., et al., "A Non-Invasive Computer Vision System for Reliable Eye Tracking". *Proceedings ACM SIGCHI* (2000).

Horvitz, E., et al., "Attention-Sensitive Alerting". *Proceedings of UAI '99 Conference on Uncertainty and Artificial Intelligence*, pp. 305-313 (1999).

Ji, Qiang, et al., "Eye and gaze tracking for interactive graphic display" *Proceedings of the Second International Symposium on Smart Graphics*, Jun. 11-13: 79-85 (2002).

Lankford, C. "Effective Eye-Gaze Input into Windows". *Proceedings of the Eye Tracking Research & Applications Symposium* pp. 23-27(2000).

LC Technologies, Inc. "The Eyegaze Development System User's Guide" (1998).

(56) References Cited

OTHER PUBLICATIONS

Maglio, P. P., et al., "Gaze and Speech in Attentive User Interfaces". *Proceedings of the Third International Conference on Multimodal Interfaces. LNCS Series, Springer-Verlag In: Lecture Notes in Computer Science* vol. 1948: 1-7 (2000).
Maglio, P. P., et al. "SUITOR: An Attentive Information System". *Proceedings of the International Conference on Intelligent User Interfaces* (2000).
Matlock, T., et al., "Designing Feedback for an Attentive Office". *Proceedings of the Eighth IFIP Conference on Human-Computer Interaction* (2001).
Matlock, T., et al., "See What I Mean: On Gaze and Speech in Attentive Environments", *Manuscript. IBM Almaden Research Center*, San Jose, CA (1999).
Morimoto, C.H., et al., "Free Head Motion Eye Gaze Tracking Without Calibration". *Extended Abstracts of CHI 2002*, Apr. 20-25, pp. 586-587 (2002).
Morimoto, C., et al., "Pupil Detection and Tracking Using Multiple Light Sources". *Image and Vision Computing* 18: 331-335 (2000).
Shell, J., et al., "Interacting with Groups of Computers". *Special Issue on Attentive User Interfaces, Communications of the ACM* 46: 40-46 (2003).
Shih, S.-W., et al., "A Calibration-Free Gaze Tracking Technique" *Proceedings of ICPR*, pp. 201-204 (2000).
Starker, I. et al., "A Gaze-Responsive Self-Disclosing Display". *Proceedings of CHI*, April, pp. 3-9 (1990).
Toyama, K., et al., "Bayesian Modality Fusion: Probabilistic Intregration of Multiple Vision Algorithms for Head Tracking". *Proceedings of the Fourth Asian Conference on Computer Vision* (2000).
Vertegaal, R. "Attentive User Interfaces". *Editorial, Special Issue on Attentive User Interfaces, Communications of the ACM* 46: 31-33 (2003).
Vertegaal, R. et al., "GAZE-2: An Attentive Video Conferencing System", *Extended Abstracts of ACM CHI 2002 Conference on Human Factors in Computing Systems Minneapolis*: ACM Press (2002).
Vertegaal, R. et al., "Designing Attentive Cell Phones Using Wearable EyeContact Sensors". *Extended Abstracts of ACM CHI 2002 Conference on Human Factors in Computing Systems*. Minneapolis: ACM Press (2002).
Vertegaal, R. "Designing Attentive Interfaces". *Proceedings of ACM ETRA Symposium on Eye Tracking Research and Applications* (2002). New Orleans: ACM Press (2002).
Vertegaal, R., et al. , "Why Conversational Agents Should Catch the Eye". *Summary of ACM CHI 2000 Conference on Human Factors in Computing*. The Hague, ACM (2000).
Vertegaal, R. "Designing Awareness with Attention-Based Groupware". *Proceedings of INTERACT'99. IFIP*: Edinburgh (1999).
Vertegaal, R. "The GAZE Groupware System: Mediating Joint Attention in Multiparty Communication and Collaboration". *Proceedings of ACM CHI'99 Conference on Human Factors in Computing Systems*. Pittsburgh, PA USA: ACM (1999).
Vertegaal, R. "Look Who's Talking to Whom". *PhD Thesis*. Enschede, The Netherlands: Cognitive Ergonomics Department, Twente University, ISBN 90-3651 1747 (1998).
Vertegaal, R., et al., "Look Who's Talking: The GAZE Groupware System". *Summary of ACM CHI'98 Conference on Human Factors in Computing Systems*. LA: ACM SIGCHI (1998).
Vertegaal, R., et al., "Catching the Eye: Management of Joint Attention in Cooperative Work". *SIGCHI Bulletin (29)4. ACM SIGCHI* (1997).
Zhai, S., et al., "Manual and Gaze Input Cascaded (MAGIC) Pointing". *CHI* 99: 15-20 (1999).
Tock, D. et al., "Tracking and measuring drivers' eyes" Image and Vision Computing, vol. 14: 541-547 (1996).
Garau, M., et al., "The Impact of Eye Gaze on Communication using Humanoid Avatars", ACM SIGCHI, vol. 3, issue 1: 309-316 (2001).
Gemmell, J., et al., "Gaze Awareness for Video-conferencing: A Software Approach", IEEE Multimedia, pp. 26-35 (2000).

Glenstrup, A.J. et al., "Eye Controlled Media: Present and Future State", Thesis from University of Copenhagen, pp. 1-82 (1995).
Saito, H. et al., "Applications of Driver's Line of Sight to Automobiles—What can Driver's Eye Tell", IEEE, pp. 21-26 (1994).
Stiefelhagen, R. et al., "Gaze Tracking for Multimodal Human-Computer Interaction", IEEE, IC ASSP (1997).
Zelinsky, A., "Visual Human-Machine Interaction", Artificial Intelligence Conference: pp. 440-452 (1999).
Extended European Search Report on Divisional Application No. 10183694.8 dated Apr. 26, 2011.
Eriksson, M., et al., "Driver fatigue: a vision-based approach to automatic diagnosis", Transportation Research Part C, vol. 9: 399-413 (2001).
Grace, R., et al., "A Drowsy Driver Detection System for Heavy Vehicles", IEEE, pp. 136-1-136-8 (1998).
Kim, J. et al., "Intelligent process control via gaze detection technology", Engineering Applications of Artificial Intelligence, vol. 13: 577-587 (2000).
Sibert, J.L. et al., "The Reading Assistant: Eye Gaze Triggered Auditory Prompting for Reading Remediation", CHI Letters, vol. 2: 101-107 (2000).
Slewiorek, D., "New Frontiers of Application Design", Communications of the ACM, vol. 45, No. 12: 79-82 (2002).
Selker, T. et al., "Eye-Bed", Multimodal Resources and Multmodal Systems Evaluation Workshop Program, pp. 78-91 (Jun. 1, 2002).
Selker, T. et al., "A Testbed for Intelligent Eye Research", LREC 2002, Workshop on Multi-Modal Resources and Mult-Modal System Evaluation, (2002).
Farid, M. et al., "Computer Display Control and Interaction Using Eye-gaze". Journal of the Society for Information Display, (Oct. 3, 2002).
Darrell, T. et al., "Face-Responsive Interfaces: From Direct Manipulation to Perceptive Presence", Springer-Verlag Berlin Heidelberg, (2002).
Christian, A. et al., "Digital Smart Kiosk Project", Association for Computing Machinery SIGCHI, (Apr. 18, 1998).
Hinkley, K. et al., "Sensing Techniques for Mobile Interaction", Association for Computing Machinery, (Nov. 5-8, 2000).
Jacob, R.J.K., "What you Look at is What you Get", Association for Computing, (Apr. 1990).
Hinckley, K. et al., "Toward More Sensitive Mobile Phones", Association for Computing Machinery, (Nov. 11-14, 2001).
Schmidt, A. et al., "Advanced Interaction in Context", Springer-Verlag Berlin Heidelberg, (1999).
Exhibit B01: Invalidity Contention for counterpart U.S. Pat. No. 8,096,660.
Exhibit B02: Invalidity Contention for counterpart U.S. Pat. No. 8,096,660.
Exhibit B03: Invalidity Contention for counterpart U.S. Pat. No. 8,096,660.
Exhibit B04: Invalidity Contention for counterpart U.S. Pat. No. 8,096,660.
Exhibit B05: Invalidity Contention for counterpart U.S. Pat. No. 8,096,660.
Exhibit B06: Invalidity Contention for counterpart U.S. Pat. No. 8,096,660.
Exhibit B07: Invalidity Contention for counterpart U.S. Pat. No. 8,096,660.
Exhibit B08: Invalidity Contention for counterpart U.S. Pat. No. 8,096,660.
Exhibit B09: Invalidity Contention for counterpart U.S. Pat. No. 8,096,660.
Exhibit B010: Invalidity Contention for counterpart U.S. Pat. No. 8,096,660.
Exhibit B011: Invalidity Contention for counterpart U.S. Pat. No. 8,096,660.
Exhibit B012: Invalidity Contention for counterpart U.S. Pat. No. 8,096,660.
Exhibit B013: Invalidity Contention for counterpart U.S. Pat. No. 8,096,660.
Exhibit B014: Invalidity Contention for counterpart U.S. Pat. No. 8,096,660.

(56) References Cited

OTHER PUBLICATIONS

Exhibit B015: Invalidity Contention for counterpart U.S. Pat. No. 8,096,660.
Exhibit B016: Invalidity Contention for counterpart U.S. Pat. No. 8,096,660.
Exhibit B017: Invalidity Contention for counterpart U.S. Pat. No. 8,096,660.
Exhibit B018: Invalidity Contention for counterpart U.S. Pat. No. 8,096,660.
Exhibit B019: Invalidity Contention for counterpart U.S. Pat. No. 8,096,660.
Exhibit B020: Invalidity Contention for counterpart U.S. Pat. No. 8,096,660.
Exhibit B021: Invalidity Contention for counterpart U.S. Pat. No. 8,096,660.
Exhibit B022: Invalidity Contention for counterpart U.S. Pat. No. 8,096,660.
Exhibit B023: Invalidity Contention for counterpart U.S. Pat. No. 8,096,660.
Exhibit B024: Invalidity Contention for counterpart U.S. Pat. No. 8,096,660.
Exhibit B025: Invalidity Contention for counterpart U.S. Pat. No. 8,096,660.
Exhibit B026: Invalidity Contention for counterpart U.S. Pat. No. 8,096,660.
Exhibit B027: Invalidity Contention for counterpart U.S. Pat. No. 8,096,660.
Exhibit B028: Invalidity Contention for counterpart U.S. Pat. No. 8,096,660.
Exhibit B029: Invalidity Contention for counterpart U.S. Pat. No. 8,096,660.
Exhibit B030: Invalidity Contention for counterpart U.S. Pat. No. 8,096,660.
Exhibit B031: Invalidity Contention for counterpart U.S. Pat. No. 8,096,660.
Exhibit B032: Invalidity Contention for counterpart U.S. Pat. No. 8,096,660.
Kim, J. et al., "Intelligent Process Control via Gaze Detection Technology", Yonsei University, (1999).
Hinckley, K. et al., "Sensing Techniques for Mobile Interaction", YouTube Association for Computing Machinery, (2000). http://www.youtube.com/watch?feature=player_detailpage&v=HpC...282u-dY.
"Bill Gates Remarks", Association for Computing Machinery, (Apr. 2, 2001).
Exhibit D01: Invalidity Contention for counterpart U.S. Pat. No. 8,672,482.
Exhibit D02: Invalidity Contention for counterpart U.S. Pat. No. 8,672,482.
Exhibit D03: Invalidity Contention for counterpart U.S. Pat. No. 8,672,482.
Exhibit D04: Invalidity Contention for counterpart U.S. Pat. No. 8,672,482.
Exhibit D05: Invalidity Contention for counterpart U.S. Pat. No. 8,672,482.
Exhibit D06: Invalidity Contention for counterpart U.S. Pat. No. 8,672,482.
Exhibit D07: Invalidity Contention for counterpart U.S. Pat. No. 8,672,482.
Exhibit D08: Invalidity Contention for counterpart U.S. Pat. No. 8,672,482.
Exhibit D09: Invalidity Contention for counterpart U.S. Pat. No. 8,672,482.
Exhibit D010: Invalidity Contention for counterpart U.S. Pat. No. 8,672,482.
Exhibit D011: Invalidity Contention for counterpart U.S. Pat. No. 8,672,482.
Exhibit D012: Invalidity Contention for counterpart U.S. Pat. No. 8,672,482.
Exhibit D013: Invalidity Contention for counterpart U.S. Pat. No. 8,672,482.
Exhibit D014: Invalidity Contention for counterpart U.S. Pat. No. 8,672,482.
Exhibit D015: Invalidity Contention for counterpart U.S. Pat. No. 8,672,482.
Exhibit D016: Invalidity Contention for counterpart U.S. Pat. No. 8,672,482.
Exhibit D017: Invalidity Contention for counterpart U.S. Pat. No. 8,672,482.
Exhibit D018: Invalidity Contention for counterpart U.S. Pat. No. 8,672,482.
Exhibit D019: Invalidity Contention for counterpart U.S. Pat. No. 8,672,482.
Exhibit D020: Invalidity Contention for counterpart U.S. Pat. No. 8,672,482.
Exhibit D021: Invalidity Contention for counterpart U.S. Pat. No. 8,672,482.
Exhibit D022: Invalidity Contention for counterpart U.S. Pat. No. 8,672,482.
Exhibit D023: Invalidity Contention for counterpart U.S. Pat. No. 8,672,482.
Exhibit D024: Invalidity Contention for counterpart U.S. Pat. No. 8,672,482.
Exhibit D025: Invalidity Contention for counterpart U.S. Pat. No. 8,672,482.
Exhibit D026: Invalidity Contention for counterpart U.S. Pat. No. 8,672,482.
Exhibit D027: Invalidity Contention for counterpart U.S. Pat. No. 8,672,482.
Exhibit D028: Invalidity Contention for counterpart U.S. Pat. No. 8,672,482.
Exhibit D029: Invalidity Contention for counterpart U.S. Pat. No. 8,672,482.
Exhibit D030: Invalidity Contention for counterpart U.S. Pat. No. 8,672,482.
Exhibit D031: Invalidity Contention for counterpart U.S. Pat. No. 8,672,482.
Exhibit D032: Invalidity Contention for counterpart U.S. Pat. No. 8,672,482.
Exhibit C01: Invalidity Contention for counterpart U.S. Pat. No. 8,322,856.
Exhibit C02: Invalidity Contention for counterpart U.S. Pat. No. 8,322,856.
Exhibit C03: Invalidity Contention for counterpart U.S. Pat. No. 8,322,856.
Exhibit C04: Invalidity Contention for counterpart U.S. Pat. No. 8,322,856.
Exhibit C05: Invalidity Contention for counterpart U.S. Pat. No. 8,322,856.
Exhibit C06: Invalidity Contention for counterpart U.S. Pat. No. 8,322,856.
Exhibit C07: Invalidity Contention for counterpart U.S. Pat. No. 8,322,856.
Exhibit C08: Invalidity Contention for counterpart U.S. Pat. No. 8,322,856.
Exhibit C09: Invalidity Contention for counterpart U.S. Pat. No. 8,322,856.
Exhibit C010: Invalidity Contention for counterpart U.S. Pat. No. 8,322,856.
Exhibit C011: Invalidity Contention for counterpart U.S. Pat. No. 8,322,856.
Exhibit C012: Invalidity Contention for counterpart U.S. Pat. No. 8,322,856.
Exhibit C013: Invalidity Contention for counterpart U.S. Pat. No. 8,322,856.
Exhibit C014: Invalidity Contention for counterpart U.S. Pat. No. 8,322,856.
Exhibit C015: Invalidity Contention for counterpart U.S. Pat. No. 8,322,856.
Exhibit C016: Invalidity Contention for counterpart U.S. Pat. No. 8,322,856.
Exhibit C017: Invalidity Contention for counterpart U.S. Pat. No. 8,322,856.

(56) References Cited

OTHER PUBLICATIONS

Exhibit C018: Invalidity Contention for counterpart U.S. Pat. No. 8,322,856.
Exhibit C019: Invalidity Contention for counterpart U.S. Pat. No. 8,322,856.
Exhibit C020: Invalidity Contention for counterpart U.S. Pat. No. 8,322,856.
Exhibit C021: Invalidity Contention for counterpart U.S. Pat. No. 8,322,856.
Exhibit C022: Invalidity Contention for counterpart U.S. Pat. No. 8,322,856.
Exhibit C023: Invalidity Contention for counterpart U.S. Pat. No. 8,322,856.
Exhibit C024: Invalidity Contention for counterpart U.S. Pat. No. 8,322,856.
Exhibit C025: Invalidity Contention for counterpart U.S. Pat. No. 8,322,856.
Exhibit C026: Invalidity Contention for counterpart U.S. Pat. No. 8,322,856.
Exhibit C027: Invalidity Contention for counterpart U.S. Pat. No. 8,322,856.
Exhibit C028: Invalidity Contention for counterpart U.S. Pat. No. 8,322,856.
Exhibit C029: Invalidity Contention for counterpart U.S. Pat. No. 8,322,856.
Exhibit C030: Invalidity Contention for counterpart U.S. Pat. No. 8,322,856.
Exhibit C031: Invalidity Contention for counterpart U.S. Pat. No. 8,322,856.
Exhibit C032: Invalidity Contention for counterpart U.S. Pat. No. 8,322,856.
Exhibit A01: Invalidity Contention for counterpart U.S. Pat. No. 7,762,665.
Exhibit A02: Invalidity Contention for counterpart U.S. Pat. No. 7,762,665.
Exhibit A03: Invalidity Contention for counterpart U.S. Pat. No. 7,762,665.
Exhibit A04: Invalidity Contention for counterpart U.S. Pat. No. 7,762,665.
Exhibit A05: Invalidity Contention for counterpart U.S. Pat. No. 7,762,665.
Exhibit A06: Invalidity Contention for counterpart U.S. Pat. No. 7,762,665.
Exhibit A07: Invalidity Contention for counterpart U.S. Pat. No. 7,762,665.
Exhibit A08: Invalidity Contention for counterpart U.S. Pat. No. 7,762,665.
Exhibit A09: Invalidity Contention for counterpart U.S. Pat. No. 7,762,665.
Exhibit A010: Invalidity Contention for counterpart U.S. Pat. No. 7,762,665.
Exhibit A011: Invalidity Contention for counterpart U.S. Pat. No. 7,762,665.
Exhibit A012: Invalidity Contention for counterpart U.S. Pat. No. 7,762,665.
Exhibit A013: Invalidity Contention for counterpart U.S. Pat. No. 7,762,665.
Exhibit A014: Invalidity Contention for counterpart U.S. Pat. No. 7,762,665.
Exhibit A015: Invalidity Contention for counterpart U.S. Pat. No. 7,762,665.
Exhibit A016: Invalidity Contention for counterpart U.S. Pat. No. 7,762,665.
Exhibit A017: Invalidity Contention for counterpart U.S. Pat. No. 7,762,665.
Exhibit A018: Invalidity Contention for counterpart U.S. Pat. No. 7,762,665.
Exhibit A019: Invalidity Contention for counterpart U.S. Pat. No. 7,762,665.
Exhibit A020: Invalidity Contention for counterpart U.S. Pat. No. 7,762,665.
Exhibit A021: Invalidity Contention for counterpart U.S. Pat. No. 7,762,665.
Exhibit A022: Invalidity Contention for counterpart U.S. Pat. No. 7,762,665.
Exhibit A023: Invalidity Contention for counterpart U.S. Pat. No. 7,762,665.
Exhibit A024: Invalidity Contention for counterpart U.S. Pat. No. 7,762,665.
Exhibit A025: Invalidity Contention for counterpart U.S. Pat. No. 7,762,665.
Exhibit A026: Invalidity Contention for counterpart U.S. Pat. No. 7,762,665.
Exhibit A027: Invalidity Contention for counterpart U.S. Pat. No. 7,762,665.
Exhibit A028: Invalidity Contention for counterpart U.S. Pat. No. 7,762,665.
Exhibit A029: Invalidity Contention for counterpart U.S. Pat. No. 7,762,665.
Exhibit A030: Invalidity Contention for counterpart U.S. Pat. No. 7,762,665.
Exhibit A031: Invalidity Contention for counterpart U.S. Pat. No. 7,762,665.
Exhibit A032: Invalidity Contention for counterpart U.S. Pat. No. 7,762,665.

* cited by examiner

METHOD AND APPARATUS FOR COMMUNICATION BETWEEN HUMANS AND DEVICES

RELATED APPLICATIONS

This application is a continuation of application Ser. No. 14/722,504, filed on May 27, 2015, now abandoned, which is a continuation of application Ser. No. 14/210,778, filed on Mar. 14, 2014, now abandoned, which is a continuation of application Ser. No. 13/866,430, filed on Apr. 19, 2013, now U.S. Pat. No. 8,672,482, which is a continuation of application Ser. No. 13/315,844, filed on Dec. 9, 2011, now abandoned, which is a continuation of application Ser. No. 12/843,399, filed on Jul. 26, 2010, now U.S. Pat. No. 8,096,660, which is a continuation of application Ser. No. 10/392,960, filed on Mar. 21, 2003, now U.S. Pat. No. 7,762,665, the contents of all of which are incorporated herein by reference in their entirety.

FIELD OF THE INVENTION

This invention relates to attentive user interfaces for improving communication between humans and devices. More particularly, this invention relates to use of eye contact/gaze direction information by technological devices and appliances to more effectively communicate with users, in device or subject initiated communications.

BACKGROUND OF THE INVENTION

Interaction with technological devices is becoming an ever-increasing part of everyday life. However, effectiveness and efficiency of such interaction is generally lacking. In particular, when seeking user input, devices such as computers, cellular telephones and personal digital assistants (PDAs) are often disruptive, because such devices cannot assess the user's current interest or focus of attention. More efficient, user-friendly interaction is desirable in interactions with household appliances and electronic equipment, computers, and digital devices.

One way that human-device interactions can be improved is by employing user input such as voice and/or eye contact, movement, or position to allow users to control the device. Many previous attempts relate to controlling computer functions by tracking eye gaze direction. For example, U.S. Pat. No. 6,152,563 to Hutchinson et al. and U.S. Pat. No. 6,204,828 to Amir et al. teach systems for controlling a cursor on a computer screen based on user eye gaze direction. U.S. Pat. Nos. 4,836,670 and 4,973,490 to Hutchinson, U.S. Pat. No. 4,595,990 to Garwin et al., U.S. Pat. No. 6,437,758 to Nielsen et al., and U.S. Pat. No. 6,421,064 and U.S. Patent Application No. 2002/0105482 to Lemelson et al. relate to controlling information transfer, downloading, and scrolling on a computer based on the direction of a user's eye gaze relative to portions of the computer screen. U.S. Pat. No. 6,456,262 to Bell provides an electronic device with a microdisplay in which a displayed image may be selected by gazing upon it. U.S. Patent Application No. 2002/0141614 to Lin teaches enhancing the perceived video quality of the portion of a computer display corresponding to a user's gaze.

Use of eye and/or voice information for interaction with devices other than computers is less common. U.S. Pat. No. 6,282,553 teaches activation of a keypad for a security system, also using an eye tracker. Other systems employ detection of direct eye contact. For example, U.S. Pat. No. 4,169,663 to Murr describes an eye attention monitor which provides information simply relating to whether or not a user is looking at a target area, and U.S. Pat. No. 6,397,137 to Alpert et al. relates to a system for selecting left or right side-view mirrors of a vehicle for adjustment based on which mirror the operator is viewing. U.S. Pat. No. 6,393,136 to Amir et al. teaches an eye contact sensor for determining whether a user is looking at a target area, and using the determination of eye contact to control a device. The Amir et al. patent suggests that eye contact information can be used together with voice information, to disambiguate voice commands when more than one voice-activated devices are present.

While it is evident that considerable effort has been directed to improving user-initiated communications, little work has been done to improve device-initiated interactions or communications.

SUMMARY OF THE INVENTION

According to a first aspect of the invention there is provided a method of modulating operation of a device, comprising: providing an attentive user interface for obtaining information about an attentive state of a user; and modulating operation of a device on the basis of said obtained information, wherein said operation that is modulated is initiated by said device.

In a preferred embodiment, said information about said user's attentive state is eye contact of said user with said device that is sensed by said attentive user interface. In another embodiment, said information about said user's attentive state is eye contact of said user with a subject that is sensed by said attentive user interface. In one embodiment, said subject is human, and said information about said user's attentive state is eye contact of said user with said human that is sensed by said attentive user interface. In another embodiment, said subject is another device. In accordance with this embodiment, when said user's attention is directed toward said other device, said modulating step comprises routing a notification to said other device. In various embodiments, said information about an attentive state of said user is based on one or more indices selected from the group consisting of eye contact, eye movement, eye position, eye gaze direction, voice, body presence, body orientation, head and/or face orientation, user activity, and brain activity/arousal.

In one embodiment of the method said sensing of eye contact comprises: obtaining successive full-frame video fields of alternating bright and dark video images of said user's pupils; and subtracting said images between frames to locate said pupils; wherein locating said pupils confirms eye contact of said user. In a preferred embodiment, said sensing of eye contact further comprises: detecting a glint in the user's eyes; and confirming eye contact of said user when said glint is aligned with said pupils.

In accordance with the first aspect of the invention, when said user's attention is not directed toward said device, said modulating step comprises notifying said user progressively, from a less interruptive notification to a more interruptive notification. In various embodiments, said notification is of at least one type selected from the group consisting of audio, visual, and tactile.

In various embodiments, said attentive user interface may be attached to or embedded in said device, or attached to or embedded in a member of the group consisting of clothing, eyewear, jewelry, and furniture. In some embodiments, the device may be a personal computer, a cellular telephone, a telephone, a personal digital assistant (PDA), or an appliance.

In various embodiments, said modulating step may comprise forwarding said obtained information to another device or a network of devices, modulating a notification being sent to said user, or forwarding said obtained information to another device or a network of devices.

According to a second aspect of the invention there is provided a method of modulating operation of a network of devices, comprising: providing each device of a network of devices with an attentive user interface for obtaining information about an attentive state of a user with respect to each device; and modulating operation of said devices on the basis of said obtained information, wherein said operation that is modulated is initiated by at least one of said devices.

In various embodiments, said operation that is modulated may comprise notification, communication, information transfer, and a combination thereof, or routing said notification, communication, information transfer, or combination thereof, to a device with which said user is engaged. The modulating operation may further comprise modulating notification of said user progressively, from a less interruptive notification to a more interruptive notification. In a preferred embodiment, said information about said user's attentive state is eye contact of said user with each said device, said eye contact being sensed by said attentive user interface.

According to a third aspect of the invention there is provided a method of modulating communication over a network of at least two devices, comprising: providing a first device of a network of devices with an attentive user interface for obtaining information about a first user's attentive state toward said first device; providing a second device of a network of devices with an attentive user interface for obtaining information about a second user's attentive state toward said second device; providing said first device of said network with a proxy for communicating to said first user said information about said second user's attentive state toward said second device; providing said second device of said network with a proxy for communicating to said second user said information about said first user's attentive state toward said first device; relaying to said network said information about said first and second users' attentive states toward said respective first and second devices; wherein communication between said first and second devices is modulated on the basis of the attentive states of said first and second users toward their respective devices.

In one embodiment, communication between said first and second devices is enabled when respective proxies indicate that attentive states of said first and second users are toward respective devices. In other embodiments, the device may be a telephone, and the proxy may be a representation of a user's eyes. In a further embodiment, the network comprises more than two devices.

According to a fourth aspect of the invention there is provided a method of modulating operation of a cellular telephone, comprising: providing an attentive user interface for obtaining information about an attentive state of a user; and modulating operation of a cellular telephone on the basis of said obtained information, wherein said operation that is modulated is initiated by said cellular telephone. In a preferred embodiment, said information about said user's attentive state is eye contact of said user with said cellular telephone that is sensed by said attentive user interface.

According to a fifth aspect of the invention there is provided a method of modulating operation of a graphical user interface, comprising: providing a graphical user interface for displaying one or more images to a user; determining said user's eye gaze direction to obtain information about which image is being viewed by said user; and using said information to enlarge, on said graphical user interface, said image being viewed by said user, and to shrink, on said graphical user interface, one or more images not being viewed by said user, wherein said enlarging of an image does not obscure said one or more images not being viewed.

According to a sixth aspect of the invention there is provided an apparatus for detecting eye contact of a subject looking at a user, comprising an eye contact sensor worn by said user that indicates eye contact of a subject looking at the user. In a preferred embodiment, the apparatus comprises eyeglasses.

According to a seventh aspect of the invention there is provided an eye contact sensor, comprising: an image sensor for obtaining successive full-frame video fields of alternating bright and dark video images of a user's pupils; and means for subtracting said images between frames to locate said pupils; wherein said located pupils indicate eye contact of said user. In a preferred embodiment, the eye contact sensor further comprises means for detecting alignment of a glint in said user's eyes with said user's pupils; wherein alignment of said glint with said pupils indicates eye contact of said user.

BRIEF DESCRIPTION OF THE DRAWINGS

Embodiments of the invention are described below, by way of example, with reference to the accompanying drawings, wherein.

DETAILED DESCRIPTION OF THE INVENTION

Figure 1:
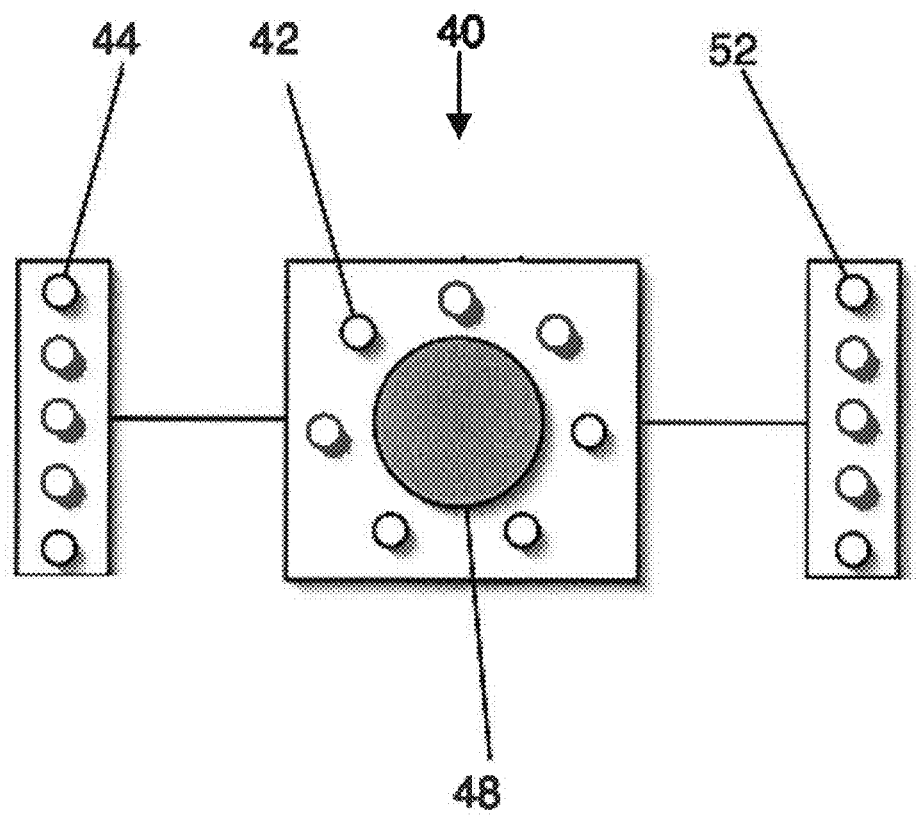
FIG. 1 is a schematic diagram of an eye contact sensor.

The present invention is based, at least in part, on the recognition that human-device interaction can be improved by implementing in devices some of the basic social rules that govern human face-to-face conversation. Such social rules are exemplified in the following scenario: Person A is in conversation with person B (or engaged in a task), and person C wishes to gain A's attention. There are a number of ways in which C may do so without interfering with A's activities. Firstly, C may position himself such that A becomes peripherally aware of his presence. Secondly, C may use proximity, movement, gaze or touch to capture A's attention without using verbal interruption. The use of nonverbal visual cues by C allows A to finish his conversation/task before acknowledging C's request for attention, e.g., by making eye contact. If A does not provide acknowledgement, C may choose to withdraw his request by moving out of A's visual field. Indeed, Frolich (1994) found that initiators of conversations often wait for visual cues of attention, in particular, the establishment of eye contact, before launching into their conversation during unplanned face-to-face encounters. Face-to-face interaction is therefore different from the way we typically interact with most technological devices in that it provides a rich selection of both verbal and nonverbal communication channels. This richness is characterized by (i) flexibility in choosing alternate channels of communication to avoid interference or interruption, (ii) a continuous nature of the information conveyed, and (iii) a bi-directionality of communication.

Electronic devices that require user input or attention do not follow such social rules in communicating with users. As a result they often generate intrusive and annoying interruptions. With the advent of devices such as cell phones and personal digital assistants (PDAs; e.g., Blackberry®, Palm Pilot®), users are regularly interrupted with requests for their attention. The present invention solves this problem by augmenting devices with attentive user interfaces: user interfaces that negotiate the attention they receive from or provide to users by negotiations through peripheral channels of interaction. Attentive user interfaces according to the invention follow social rules of human group communication, where, likewise, many people might simultaneously have an interest in speaking. In human group conversations, eye contact functions as a nonverbal visual signal that peripherally conveys who is attending to whom without interrupting the verbal auditory channel. With it, humans achieve a remarkably efficient process of conversational turn-taking. Without it, turn-taking breaks down. Thus, an attentive user interface according to the invention applies such social rules to device-initiated interactions or communications, by assessing a user's attentive state, and making a determination as to whether, when, and how to interrupt (e.g., notify) the user on the basis of the user's attentive state.

To facilitate turn-taking between devices and users in a non-intrusive manner, an attentive user interface according to the invention assesses a user's attentive state by sensing one or more parameters of the user. Such parameters are indicative of the user's attentive state, and include, but are not limited to, eye contact, eye movement, eye position, eye gaze direction, voice, body presence, body orientation, head and/or face orientation, activity, and brain activity/arousal. In the case of eye contact, movement, or position, an attentive user interface senses the eyes of the user, or between the user and a subject (e.g., another human), to determine when, whether, and how to interrupt the user. For example, notification by a PDA seeking user input can be modulated on the basis of whether the user is engaged with the PDA, with another device, or a subject. The PDA then can decide whether, when, and how to notify; for example, directly, or indirectly via another device with which the user is engaged. Body presence can be sensed in various ways, such as, for example, a motion detector, a radio frequency (RF) ID tag worn by a user and sensed using, e.g., BlueTooth®, a visual tag, electro-magnetic sensors for sensing presence/location/orientation of a user within a magnetic field, and a global positioning system (GPS).

As used herein, the term "user" is intended to mean the entity, preferably human, who is using a device.

As used herein, the term "device" is intended to mean any digital device, object, machine, or appliance that requires, solicits, receives, or competes for a user's attention. The term "device" includes any device that typically is not interactive, but could be made more user-friendly by providing interaction with a user as described herein.

As used herein, the term "subject" is intended to mean the human, device, or other object with which a user might be engaged.

As used herein, the term "attentive user interface" is intended to mean any hardware and/or software that senses, receives, obtains, and negotiates a user's attention by sensing one or more indices of a user's attentive state (e.g., eye contact, eye movement, eye position, eye gaze direction, voice, body presence, body orientation, head and/or face orientation, activity, brain activity/arousal), with appropriate hardware and associated algorithms and/or software for interfacing the attentive user interface with a device or a network of devices. An attentive user interface comprises portions for sensing user attentive state and for processing and interfacing/relaying information about the user's attentive state to a device. Such portions can be housed as a unit or as multiple units. Interfacing an attentive user interface with a device comprises providing an output from the attentive user interface to the device, which controls operation of the device. An attentive user interface of the invention can perform one or more tasks, such as, but not limited to, making decisions about user presence/absence, making decisions about the state of user attention, prioritizing communications in relation to current priorities in user attention as sensed by the attentive user interface, modulating channels and modes of delivery of notifications and/or information and/or communications to the user, modulating presentation of visual or auditory information, and communicating information (e.g., indices) about user attention to other subjects.

As used herein, the term "attentive state" is intended to mean a measure or index of a user's engagement with or attention toward a subject. Examples of such indices are eye contact, eye movement, eye position, eye gaze direction, voice, body presence, body orientation, head and/or face orientation, activity, and brain activity/arousal.

As used herein, the term "notify" or "notification" is intended to mean the signalling or soliciting, usually by a device, for a user's attention. For example, notification can employ any cue(s) that act on a user's senses to solicit the user's attention, such as one or more of audio, visual, tactile, and olfactory cues.

As used herein, the term "modulating" is intended to mean controlling, enabling and/or disabling, or adjusting (e.g., increasing and/or decreasing). With respect to notification, modulating includes, for example, turning notification on or off, delaying notification, changing the volume or type of notification, and the like. For example, notification can be gradually modulated from less interruptive (e.g., quiet) to more interruptive (e.g., loud), as time passes without user acknowledgement. Modulating also refers to changing the vehicle or channel for notification, communication, or data transfer; for example, by routing such through a network to a more appropriate device. For example, in the case of an urgent notification, modulation might encompass routing the notification to a device with which the user is engaged, increasing the likelihood that the user receives the notification (see Example 4, below).

As used herein, the terms "mediated communication" and "mediated conversation" refer to communication or conversation that takes place through a medium such as video or audio devices/systems, such that there is no face-to-face conversation between the participants. In most mediated communications, participants involved are remotely located relative to one another.

In one embodiment of the invention, an attentive user interface dynamically prioritizes the information it presents, and the way it is presented, to a user, such that information processing resources of both user and system are optimally used. This might involve, for example, optimally distributing resources across a set of tasks. An attentive user interface does this on the basis of knowledge—consisting of a combination of measures and models—of the present, and preferably also the past and/or future states of the user's attention, taking into account the availability of system resources. Attentive user interfaces may employ one or more of eye contact, eye movement, eye position, eye gaze direction, voice, body presence, body orientation, head and/or face orientation, activity, brain activity/arousal to detect attentive state. Attentive user interfaces may store any of the above measures as a model, used to govern decisions about the user's attentive state.

In a preferred embodiment, an attentive user interface employs eye contact and/or eye gaze direction information, optionally in combination with any further measures of user presence mentioned above. Eye contact sensors as used in the invention are distinguished from eye trackers, in that eye contact sensors detect eye contact when a subject or user is looking at the sensor, whereas eye trackers detect eye movement to determine the direction a subject or user is looking.

In some embodiments, an attentive user interface employs an eye contact sensor based on bright-dark pupil detection using a video camera (see, for example, U.S. Pat. No. 6,393,136 to Amir et al.). This technique uses intermittent on-camera axis and off-camera axis illumination of the eyes to obtain an isolated camera image of the user's pupil. The on-axis illumination during one video field results in a clear reflection of the retina through the pupil (i.e., the bright pupil effect). This reflection does not occur when the eyes are illuminated by the off-axis light source in the next video field. By alternating on-axis with off-axis illumination, synchronized with the camera clock, successive video fields produce alternating bright and dark images of the pupil. By subtracting these images in real time, pupils can easily be identified within the field of view of a low-cost camera. Preferably, eyes are illuminated with infrared (IR) light, which does not distract the user.

However, accuracy of the eye contact sensor can be improved by measuring the glint, or first purkinje image, of the eyes. The glint is a reflection of light on the outer side of the cornea, that acts as a relative reference point, which can be used to eliminate the confounding effects of head movements. The glint moves with the head, but does not rotate with the pupil because the eye is spherical. Thus, the position of the glint relative to the pupil can be used to determine the direction a user or subject is looking. For example, when the user is looking at the camera and the glint is inside the pupil, the pupil, glint, and camera are aligned on the camera axis, indicating that the user is looking at the camera, and hence eye contact is detected.

We have used this technique in attentive user interfaces to identify eye contact of users at approximately 3 meters distance, using standard 320×240 CCD cameras with analog NTSC imaging. The ability to obtain a reliable estimate of the pupils at larger distances is limited by the resolution of such cameras. Use of mega-pixel COD cameras, although expensive, make possible the detection of pupils at greater distances. Alternatively, high-resolution CMOS imaging technology (e.g., Silicon Imaging MegaPixel Camera SI-3170U or SI-3200U) allows the manufacture of low-cost high-resolution eye contact sensors.

An example of a high-resolution eye contact sensor is shown in FIG. 1. The high-resolution eye contact sensor 40 comprises an image sensor (i.e., a camera), such as a black and white high-resolution COD or CMOS image sensor (3 Mpixels or more), with a multifocus lens 48. Preferably, infrared light is used to illuminate the eyes, and accordingly an infrared filter is disposed beneath the lens 48. The output of the image sensor is connected to circuitry which uses the camera frame sync signal to illuminate the space in front of the camera with on-axis light produced by, e.g., an array of infrared LEDs 42, and off-axis light produced by, e.g., two arrays of infrared LEDs 44,52. On-axis and off-axis light is produced alternately with odd and even frames. For example, on-axis light is produced each odd frame and off-axis light is produced every even frame. Images are processed to locate the user's/subject's eyes, and corresponding information is relayed to hardware/software of an attentive user interface. The information is used by the attentive user interface to determine, whether, how, when, etc., to interrupt or send a notification to a user. In some embodiments the image processing circuitry and software may reside in the eye contact sensor unit 40, whereas in other embodiments the circuitry and software are remote (e.g., associated with a host computer) and suitably connected to the eye contact sensor unit 40 using, e.g., a high-bandwidth video link, which can be wireless, such as Apple® FireWire® or USB 2 based. As shown in the eye protocol specification below, information relating to eye contact may include whether eyes are found in the image, where the eyes are, how many eyes are present, whether the eyes are blinking, and if the unit is calibrated, what the eyes are looking at in screen coordinates. The information may also include a flag for each eye when the eyes are looking straight at the camera.

| Eye Protocol Specification | | | |
|---|---|---|---|
| 1. EYE_NOT_FOUND | | | |
| ID | End | | |
| 0 | CR & LF | | |
| ASCII CR = 77 or 4D | | | |
| 2. HEAD_FOUND | | | |
| ID | D1 | D2 | End |
| 1 | Number of Heads | {(T L B R)$_1$ . . . (T L B R)$_9$} | CR & LF |

D1: Number of Heads
D1 = {1, . . . , 9}
D2: Head Boundary Box

-continued

| Eye Protocol Specification |
|---|
| D2 = {(Top Left Bottom Right)$_1$, ... , (Top Left Bottom Right)$_9$}<br>Numbers in ASCII format (unsigned int) separated by ASCII space |

3. EYE_FOUND

| ID | D1 | D2 | End |
|---|---|---|---|
| 2 | Number of Eyes | {($X_g$ $Y_g$ $X_p$ $Y_p$)$_1$ ... ($X_g$ $Y_g$ $X_p$ $Y_p$)$_9$} | CR & LF |

D1: Number of Eyes
D1 = {1, ... , 9}
D2: Glint and pupil Coordinate
D2 = (($X_g$ $Y_g$ $X_p$ $Y_p$)$_1$, ... , ($X_g$ $Y_g$ $X_p$ $Y_p$)$_9$)
Numbers in ASCII format (unsigned int) separated by ASCII space

4. EYE_BLINK

| ID | D1 | D2 | End |
|---|---|---|---|
| 3 | Number of Eyes | {$F_1$ ... $F_9$} | CR & LF |

D1: Number of Eyes
D1 = {1, ... , 9}
D2: Blink
D2 F = {0, 1}
0 = NOT_BLINK
1 = BLINK
Numbers in ASCII format (unsigned int) separated by ASCII space

5. EYE_CONTACT

| ID | D1 | D2 | End |
|---|---|---|---|
| 4 | Number of Eyes | {$F_1$ ... $F_9$} | CR & LF |

D1: Number of Eyes
D1 = {1, ... , 9}
D2: Eye Contact
D2 F = {0, 5}
0 = No Contact
5 = Contact
Numbers in ASCII format (unsigned int) separated by ASCII space

6. CALIBRATED_SCREEN_COORDINATE

| ID | D1 | End |
|---|---|---|
| 5 | (x, y) | CR & LF |

D1: Screen Coordinate (x, y)
Numbers in ASCII format (unsigned int) separated by ASCII space
{ } = Data set
( ) = Subset Preferably, the eye contact sensor determines the orientation of pupils with a spatial accuracy of, for example, 1 meter at 5 meters distance (about 10 degrees of arc) and a head movement tolerance of, for example, 20 degrees of arc, at a distance of 5 meters or more. For best performance, the frame rate of the eye contact sensor's camera should be as high as possible, and in the order of 100 Hz. The effective sampling rate of the sensor preferably corresponds to at least 20 Hz, given that the minimum human fixation time is in the order of 100 ms.

It should be noted that the use of a subtraction algorithm to locate pupils results in a tradeoff between temporal and spatial resolution. In one embodiment, in which image subtraction occurs within frames (see, e.g., U.S. Pat. No. 6,393,136 to Amir et al.), resulting in an effective spatial resolution of the sensor of only half that of the camera. Here, the image processing algorithm and LEDs are synchronized with half-frame fields generated by an NTSC or other interlaced camera technology.

Figure 2:
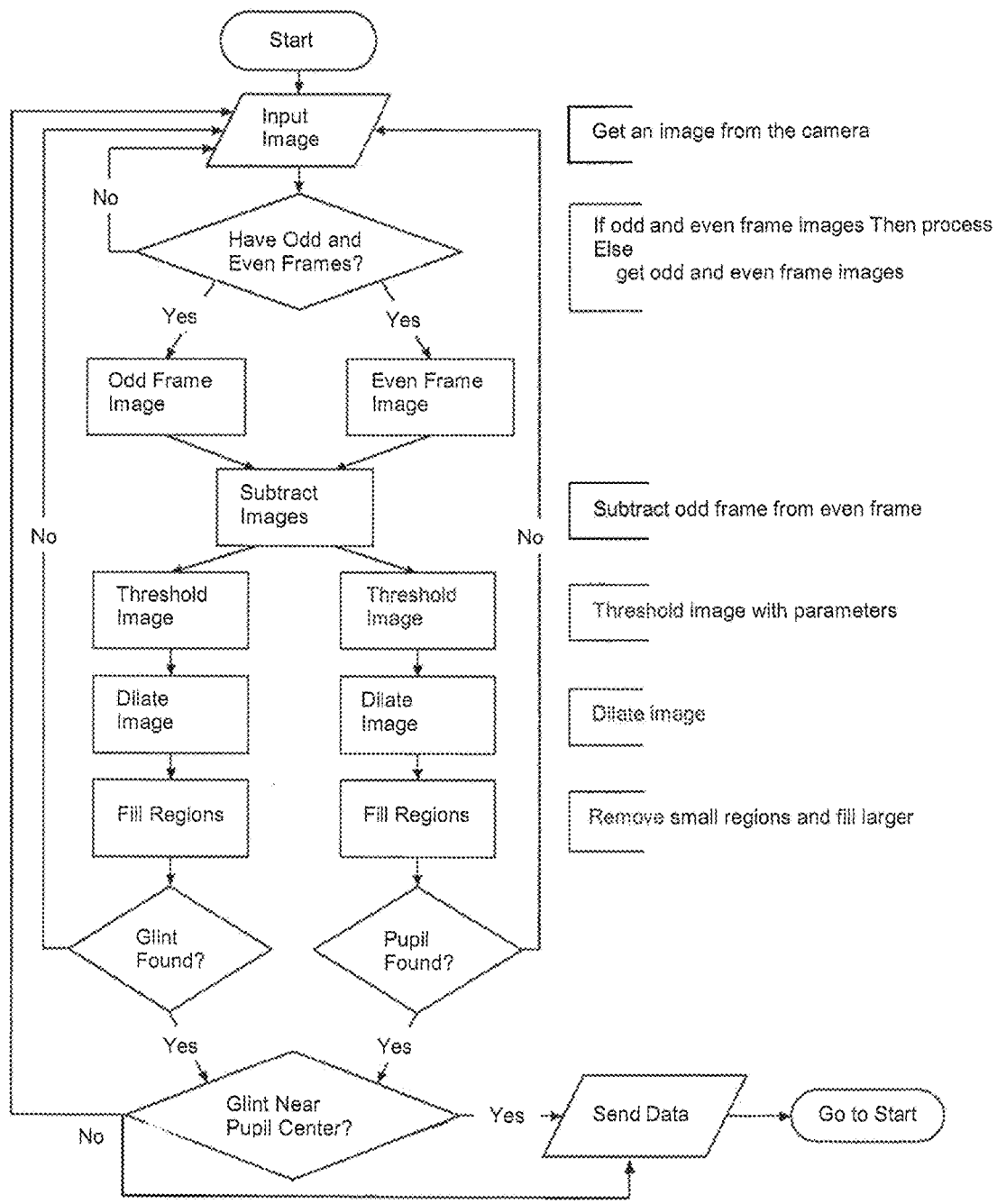
FIG. 2 depicts an algorithm for an eye contact sensor in accordance with an embodiment of the invention.

However, the invention provides, in one aspect, a method and apparatus for obtaining eye contact information in which image subtraction occurs between frames (by subtracting an odd frame from an even frame, or vice versa), as shown in the algorithm of FIG. 2. This allows the use of the full camera resolution, and thus a greater tracking range, while reducing the effective frame or sampling rate by half. The subtraction algorithm and LEDs are synchronized with a full frame clock generated by the camera and the minimum sampling frequency of the camera is preferably in the order of about 30 to about 40 Hz.

In other embodiments an attentive user interface uses eye gaze direction as input about a user's attentive state. Eye gaze direction is detected by an eye tracker, such as that described in detail in U.S. Pat. No. 6,152,563 to Hutchinson et al.

Figure 3:
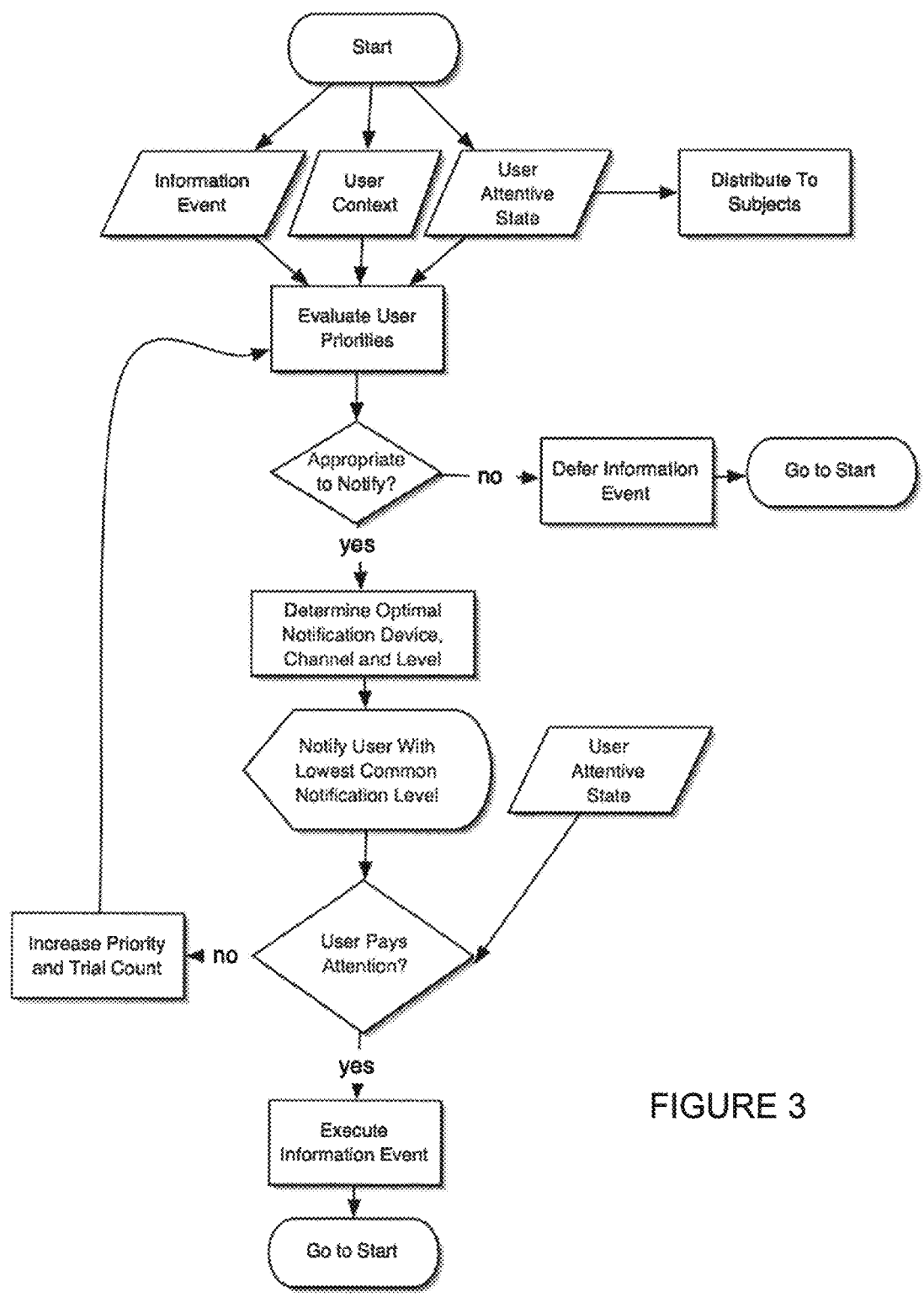
FIG. 3 depicts an algorithm for an attentive user interface in accordance with an embodiment of the invention.

An attentive user interface of the invention may be applied to user-initiated control of a device using, for example, eye contact and/or eye gaze direction, with or without further input, such as voice, body presence, and the like. However, the invention is particularly applicable to device-initiated communication with a user, such as, for example, notifying a user of an incoming message, or of a task requiring user input. As shown in FIG. 3, an attentive user interface, running on a such a device, senses and evaluates one or more indices of user attention (e.g., eye contact, eye movement, eye position, eye gaze direction, voice, body presence, body orientation, head and/or face orientation, activity, brain activity/arousal) to determine whether, when, and how to notify, interrupt, respond or respond to the user, open/close communication channels, an the like. By progressively sampling the user's attention, and appropriately signaling notifications, the user can be notified with minimal interruption. For example, as shown in FIG. 3, an attentive user interface might progressively signal for the user's attention. Initially this may happen through a channel that is peripheral to the user's current activity. The interface may then wait for user acknowledgement, provided through, e.g., an input device, before opening a direct channel to the user. If, however, no user acknowledgement is received within a given period, the attentive user interface may proceed to a more direct channel to the user, increase the urgency level of the notification, or defer notification.

In one embodiment, information obtained about a user's attentive state is communicated to one or more subjects who might wish to contact the user. Such communication can be through any network by which the user and subject(s) are connected, such as a local area network, a wide area network (e.g., the Internet), or hard-wired or wireless (e.g., cellular) telephone network. Subjects can evaluate the information about the user's attentive state, and, using rules of social engagement, decide whether or not to contact the user. For example, in telephonic communications (as described in detail in Example 1), information about the user's current attentive state is communicated to a subject attempting to telephone the user. The subject can decide whether to proceed with the telephone call on the basis of such information.

Further, the invention provides for an environment in which multiple devices, each equipped with attentive user interfaces, are networked, such that information concerning to which device the user's attention is directed is available to all devices on the network. By progressively signaling notifications (e.g., in the case of a cell phone, the phone starts by ringing quietly and progressively rings louder depending on urgency of the call and/or proximity to the user; or, an icon on the cell phone's screen changes as urgency increases), and by determining which device the user is currently attending to, a notification and/or message can be forwarded to the appropriate device so that the message is received with minimal interruption of the user's primary task.

Figure 4:
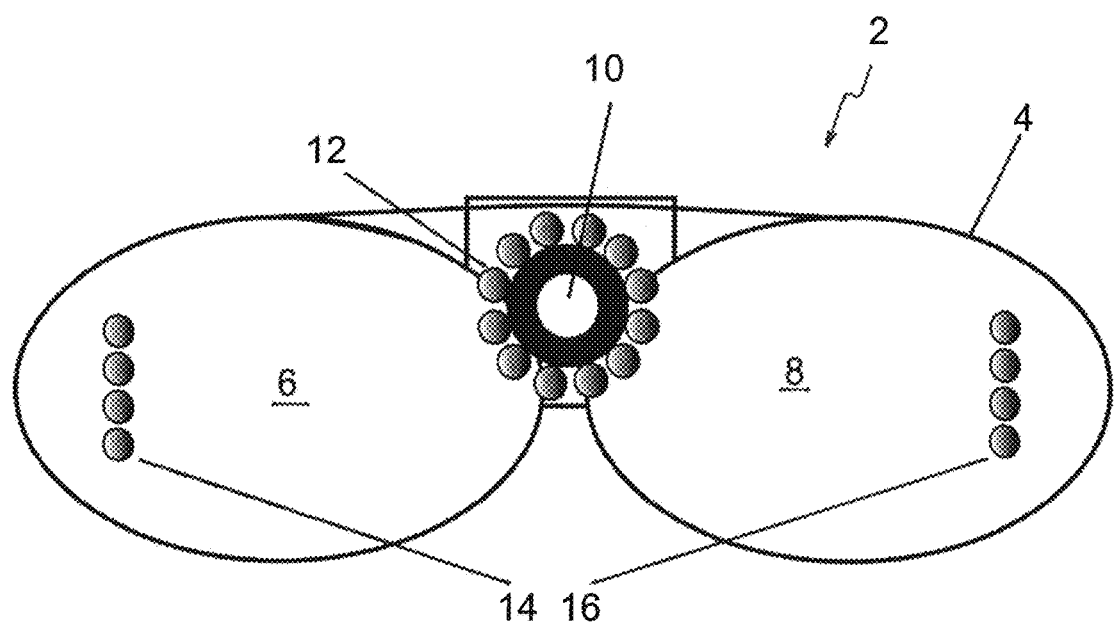
FIG. 4 shows eye glasses equipped with an eye contact sensor in accordance with an embodiment of the invention.

There are numerous applications of an attentive user interface according to the invention, in addition to those discussed above. In some embodiments, the hardware component of the attentive user interface is small and light weight, such that it can be embedded in or attached to a personal electronic device such as a cell phone, jewelry, clothing, or eyeglasses, and the like. For example, FIG. 4 shows a front view of a pair of eye glasses having an eye contact sensor attached thereto. The eye glasses 2 have a frame 4 and lenses 6 and 8. A camera lens 10 is embedded in the frame 4 of the glasses, pointing outward. Surrounding the camera lens 10 is an array of on-axis LED illuminators 12. Two rows of off-axis LED illuminators 14,16 are positioned near the outer peripheries of the lenses 6,8. The camera feed as well as the LED arrays are connected through wires to a control unit worn by the user. This control unit contains power and circuitry for illumination of the LEDs and camera synchronization. In one embodiment, the control unit performs computer vision processing according to an algorithm using an embedded processor board. In such an embodiment, data is sent over a wireless or wired network link to a host. In another embodiment, camera images are sent over a wireless or wired network to an external computer vision processing facility. Eye contact glasses can be used, for example, to open/close communication channels between colocated but distant users, or for regulating messaging to a user or between two or more users.

One application of eye contact glasses is to track how many individuals have looked at the user during a specified period. These data or statistics can be made available on the user through an LCD display, or sent to a networking device for further processing or display. Combined with computer vision or other means, the eye contact glasses can determine who has looked at the user, for how long, and when. In one embodiment, the eye contact glasses provides a personal attention sensor (i.e., a "hit counter"), which indicates to a user when he/she is being looked at by a subject. For example, a counter could be incremented whenever the user has been looked at by a subject, to provide information about the number of "hits". Such an embodiment can provide amusement to users in certain social settings.

In other embodiments, an attentive user interface of the invention includes a sensor for detecting one or more indices of user attentive state in combination with a "proxy".

As used herein, the term "proxy" is intended to mean any hardware or virtual (e.g., an image on a computer screen) representation of a (remote) subject's attention. For example, a proxy can be a pair of eyes, either mechanical or virtual (e.g., pictured on a computer screen), that inform a user of the state of attention of a subject with which the user is attempting to establish mediated communication (e.g., via telephone). Eye proxies are preferred because of what they represent; that is, the establishment of eye contact is related to the establishment of communication between individuals.

Figure 5:
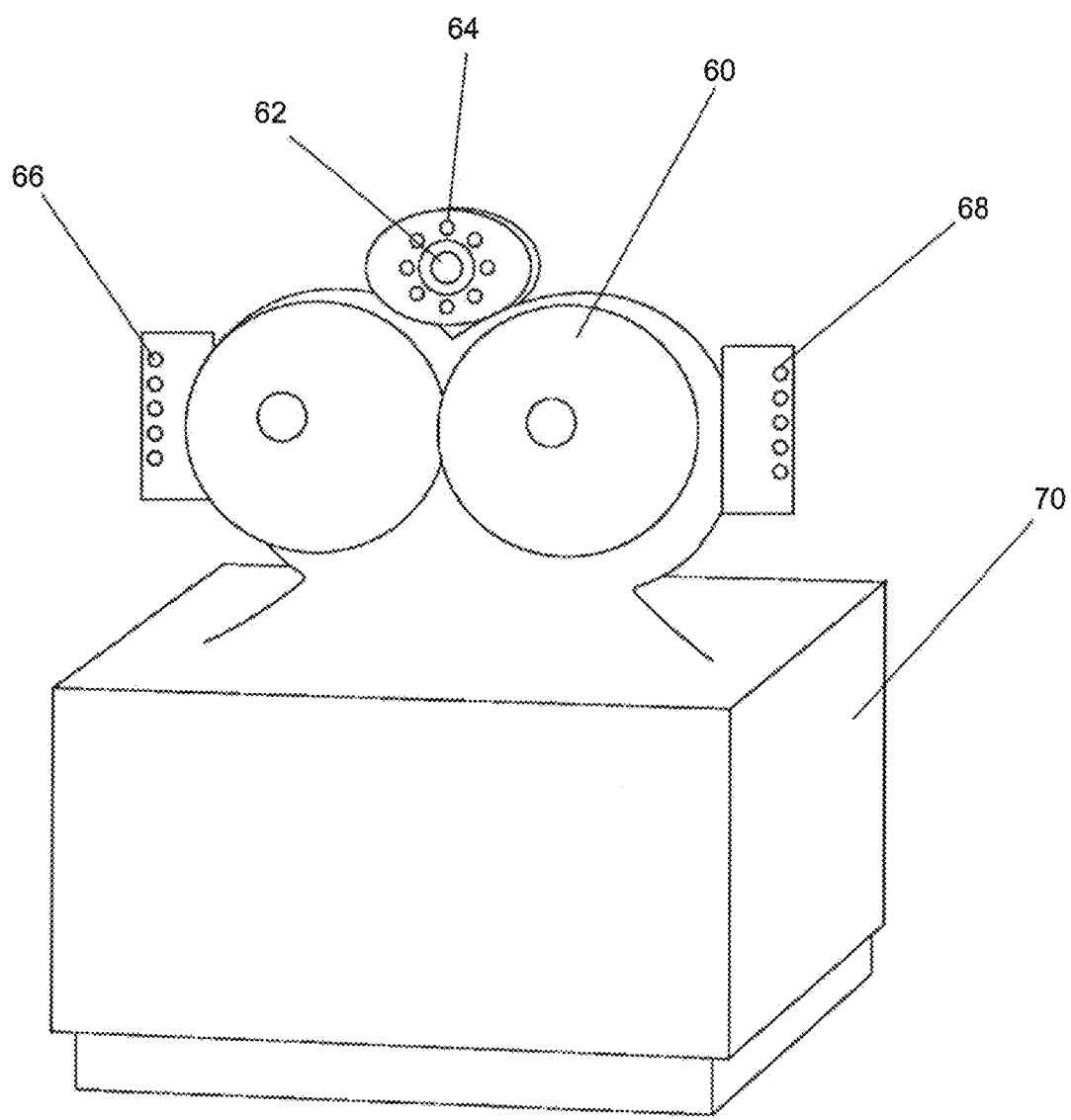
FIG. 5 is a schematic diagram of a device equipped with a mechanical eye proxy and an eye contact sensor in accordance with an embodiment of the invention.

In such embodiment, an attentive user interface, including a proxy, is used not only to obtain information about the attention of its user, but also functions to communicate robot, machine, or remote user attention directed towards a user. For example, an eye contact sensor can be mounted on a robotic actuation device that allows rotation of the eye contact sensor in 3 orientation directions. The eye contact sensor functions as virtual eyes directing the robotic device in establishing eye contact with the user when the attentive user interface's attention is directed towards that user. To convey attention, the robotic device may feature a pair of mechanical eyes, or an image or video of a remote user or computer agent. FIG. 5 shows an embodiment in which a pair of robotic mechanical eyes 60 and an eye contact sensor with camera lens 62, on-axis LED array 64, and off-axis LED arrays 66,68 are mounted on a device 70, such as a telephone.

In accordance with this embodiment, an attentive user interface with a sensor such as an eye contact sensor or an eye tracker can be used with any device to sense whether a user is available for communication, and whether a user is communicating with that device, via any route such as a keyboard, speech recognition, or manual interactions. Conversely, a proxy can signal the device's attention to the user by alignment of the eye contact sensor and/or virtual eyes with the user's eyes. If the device has not recently received visual attention from the user, it chooses an unobtrusive method to signal the user (i.e., by vibrating, rotating its eyeballs to obtain attention or any other nonverbal means). A device remains in the periphery of user activity until the user has acknowledged the device's request for attention. At that time that the device receives user attention, as measured with the eye contact sensor or through other means, a mediated communication channel with the user is established, including, for example, speech production or display of information. Example 2 describes an example of this embodiment in detail.

In further embodiments, an attentive user interface can be embedded in digital devices such as computers, personal digital assistants (PDAs), pvr/tv/vcr/cameras, telephones, household appliances, furniture, vehicles, and any other location where information about a user's attentive state can advantageously be used to modulate their behavior (see the Examples, below). An attentive user interface can be used to control video and audio recording and transmission, or to sense attention during remote or colocated meeting for retroactive automated editing (i.e., a virtual director), or for video conferencing camera selection and remote personal attention sensing (see Example 3, below). Yet other applications include, but are not limited to, remote (instant) messaging (i.e., open/close communication with a user at a distance, such as during remote arbitrage); colocated messaging (i.e., open/close communication with a user at a physical distance); dynamic email filter based on time spent reading; intelligent agent communication of attention; robot communication of attention; avatar/remote person communication of attention; presence detection for any kind of messaging system; receipt of message acknowledgement for any kind of system; notification negotiation (i.e., user acknowledgement of information presentation); notification optimization (i.e., forwarding to current device); optimization of information presentation (i.e., present notification or other information on device or part of device where user is looking); for pointing to items on displays; to determine target of keyboard commands; look to talk; eye telepointing systems (i.e., presentation and remote collaboration); vehicle navigation system operation (selection of information retrieval system); vehicle phone call answering; vehicle operator fatigue sensor; visualization and monitoring of user attention (see Example 4); attentive reasoning networks for telecommunication for telemarketeering purposes (e.g., determine where users are and what they pay attention to (see Example 5), to forward calls, or to data-mine subjects in user's attention); displaying networks of attention between users or between users and subjects; surveillance and security camera monitoring; and modifying the size, resolution, or content of a window on a graphical user interface (see Examples 6 and 7).

The contents of all cited patents, patent applications, and publications are incorporated herein by reference in their entirety.

The invention is further described by way of the following non-limiting examples.

Example 1. Attentive Cell Phone

In this example, an attentive user interface was used to apply some of the basic social rules that surround human face-to-face conversation (discussed above) to a personal electronic device, in this case a cell phone. However, the embodiment described in this example could be implemented in any electronic device or appliance.

The subtlety of interruption patterns typically used during human face-to-face communication is completely lost when using cell phones. Firstly, a person making a call usually is unaware of the status of interruptability of the user being called. Secondly, there is limited freedom in choosing alternative channels of interruption. Thirdly, the channels that do exist do not allow for any subtlety of expression. In this example, an attentive cell phone was created by augmenting a Compaq iPAQ handheld with an attentive user interface employing a low-cost wearable eye contact sensor for detecting when a user is in a face-to-face conversation with another human.

Wearable microphone headsets are becoming increasingly common with cell phones. The signal from such microphones is available with high fidelity even when the user is not making a call. We modified the cell phone to accept such input, allowing it to monitor user speech activity to estimate the chance that its user is engaged in a face-to-face conversation. Wireless phone functionality was provided by voice-over-ip software connected through a wireless LAN to a desktop-based call router. An attentive state processor running on the same machine sampled the energy level of the voice signal coming from the cell phone. To avoid triggering by non-speech behavior we used a simplified version of a turn detection algorithm described by Vertegaal (1999). That is, when more than half the samples inside a one-second window indicate speech energy, and those samples are evenly balanced across the window, the probability of speech activity by its user is estimated at 100%. For each second that the user is silent, 5% is subtracted from this estimate, until zero probability is reached. Thus we achieved a short-term memory of 20 seconds for speech activity by its user.

Speech detection works well in situations where the user is the active speaker in conversation. However, when the user is engaged in prolonged listening, speech detection alone does not suffice. Given that there is no easy way to access the speech activity of an interlocutor without violating privacy laws, we used an alternative source of input, eye contact.

According to Vertegaal (1999), eye tracking provides an extremely reliable source of information about the conversational attention of users. In dyadic conversations, speakers look at the eyes of their conversational partner for about 40% of the time. The eye contact sensor detected eye gaze toward a user by an interlocutor (i.e., a subject) to determine when the user was engaged in a conversation with the subject. In one embodiment, the contact sensor was worn on a cap worn on the user's head. In another embodiment, the sensor was embedded in the eye glasses worn by the user (see above and FIG. 4). The sensor consisted of a video camera with a set of infrared LEDs mounted on-axis with the camera lens. Another set of LEDs was mounted off-axis.

By synchronizing the LEDs with the camera clock, bright and dark pupil effects were produced in alternate fields of each video frame. A simple algorithm found any eyes in front of the user by subtracting the even and odd fields of each video frame (Morimoto, 2000). The LEDs also produced a reflection from the cornea of the eyes. These glints appeared near the center of the detected pupils when the subject was looking at the user, allowing the sensor to detect eye contact without calibration. By mounting the sensor on the head, pointing outwards, the sensor's field of view was always aligned with that of the user. Sensor data was sent over a TCP/IP connection to the attentive state processor, which processes the data using an algorithm similar to that used for speech to determine the probability that the user received gaze by an onlooker in the past 20 seconds.

The attentive state processor determined the probability that the user was in a conversation by summating the speech activity and eye contact estimates. The resulting probability was applied in two ways. Firstly, it set the default notification level of the user's cell phone. Secondly, it was communicated over the network to provide information about the status of the user to potential callers.

Communicating Attentive State to Callers

When the user opens his/her contact list to make a phone call, the attentive phone updates the attentive state information for all visible contacts. In this example, below the contact's name a menu shows the preferred notification channel. Notification channels are listed according to their interruption level: message; vibrate; private knock; public knock; and public ring. Users can set their preferred level of interruption for any attentive state. They can also choose whether to allow callers to override this choice. When contacts are available for communication, their portraits display eye contact. A typical preferred notification channel in this mode is a knocking sound presented privately through the contact's head set. When a user is busy, his/her portrait shows the back of his/her head. A preferred notification channel in this mode is a vibration through a pager unit. When a request times out, callers may choose a different notification strategy, if allowed. However, in this mode the contact's phone will never ring in public. Users can press a "Don't Answer" button to manually forestall notifications by outside callers for a set time interval. This is communicated to callers by turning the contact's portrait into a gray silhouette. Offline communication is still possible in this mode, allowing the user to leave voicemail or a text message.

The above example demonstrates how the interruptiveness of notification of a device such as a cell phone can be reduced by allowing a) the device to sense the attentive state of the user, b) the device to communicate this attentive state to subjects, and c) subjects to follow social rules of engagement on the basis of this information. Secondly, interruptiveness is reduced by the device making intelligent decisions about its notification method on the basis of obtained information about the user's attentive state.

Example 2. Telephone Proxy

Mediated communications systems such as a telephone typically require callers to interrupt remote individuals before engaging into conversation. While previous research has focused on solving this problem by providing awareness cues about the other person's availability for communication, there has been little work on supporting the negotiation of availability that typically precedes communication in face-to-face situations. Face-to-face interactions provide a rich selection of verbal and non-verbal cues that allow potential interlocutors to negotiate the availability of their attention with great subtlety.

In this example we present a mechanism for initiating mediated conversations through eye contact. In our attentive telephone, referred to herein as "eyePHONE", telephones were equipped with an attentive user interface including an eye proxy and an eye contact sensor. The eye proxy serves as a surrogate that indicates to a user the availability and attention of a remote user for communication, and the eye contact sensor conveys information about the user's attention to the remote user. Users initiate a call by jointly looking at each other's eye proxy. This allows users to implement some of the basic social rules of face-to-face conversations in mediated conversations. This example relates to use of only two devices (telephones); however, it will be understood that this technology could be applied to any number of devices on a network.

The eye proxy consisted of a pair of Styrofoam® eyes, actuated by a motorized Sony EVI-D30 camera. The eyes were capable of rotating 180° horizontally and 80° vertically around their base. Eye contact of a user looking at the eye proxy was detected by an eye contact sensor, as described above (see FIG. 5), mounted above the eyes. Once the pupils of a user were located, the proxy maintained eye contact by adjusting the orientation of the eyes such that pupils stayed centered within the eye contact sensor image. Audio communication between eyePHONES was established through a voice-over-IP connection.

Figure 6:
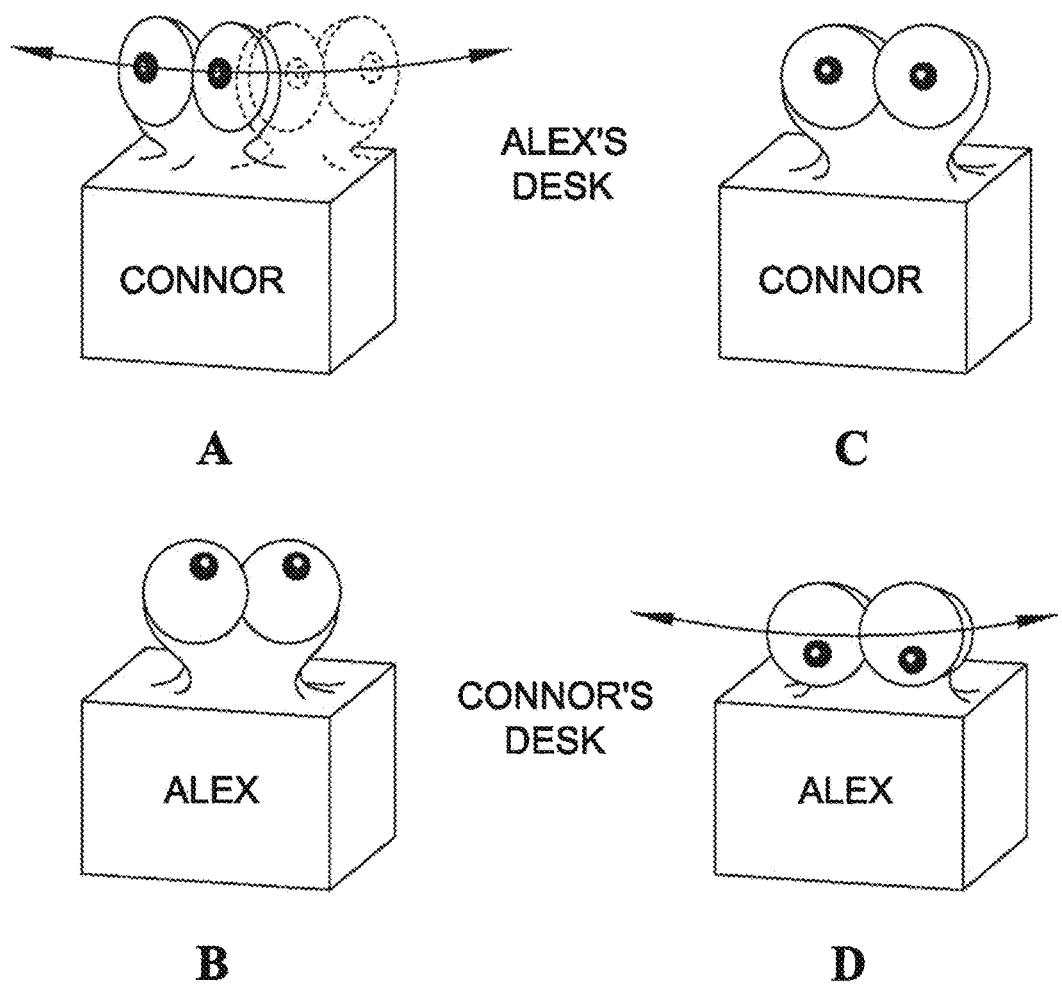
FIG. 6 depicts a scheme for telephone eye proxy in accordance with an embodiment of the invention.

To communicate the negotiation of mutual attention, we developed a set of gestures for eyePHONEs, shown in FIG. 6. With reference to FIG. 6, the following scenario illustrates how users may gradually negotiate connections through these eye gestures: Connor wishes to place a call to Alex. He looks at Alex's proxy, which begins setting up a voice connection after a user-configurable threshold of 1.5 s of prolonged eye contact. The proxy communicates that it is busy by iteratively glancing up—and looking back at Connor (see FIG. 6b). On the other side of the line, Connor's proxy starts moving its eyes, and uses the eye contact sensor to find the pupils of Alex (see FIG. 6a). Alex observes the activity of Connor's proxy on his desk, and starts looking at the proxy's eye balls. When Connor's proxy detects eye contact with Alex, the eyePHONES establish a voice connection (see FIG. 6c). If Alex does not want to take the call, he either ignores the proxy or looks away after having made brief eye contact. Alex's proxy on Connor's desk conveys Alex's unavailability by shaking its eyes, breaking eye contact, and not establishing a voice connection (see FIG. 6d). If Connor decides his call is too urgent, he may choose to press a button that produces an audible ring. Optionally, calls may be set to complete automatically when proxies determine a lack of eye contact over a user-configurable time period.

EyePHONES were also used to represent multiple participants during conference calls. Unlike regular conference calls, the negotiation of connections using nonverbal cues allows group members to enter at different times without interrupting the meeting. Furthermore, we implemented a "cocktail party" feature to facilitate the establishment of side conversations. When this is active, the speaker volume of a person's proxy depends on the amount of eye contact received from that person.

Example 3. Audio/Video Applications

Attentive user interfaces using eye contact sensors may function to direct video cameras, or recording facilities, or to deliver audiovisual content. By mounting an eye contact sensor on a camera, and connecting its signal to the recording of this camera, an automated direction system can automatically switch to the camera currently looked at by a presenter.

Similarly, televisions and other audiovisual content delivery systems can be augmented with eye contact sensors to determine whether that content is being viewed, and to take appropriate action when it is no longer viewed. In combination with a personal video recording system, this may involve tracking user attention automatically for various shows, skipping commercials on the basis of perceived attentiveness, modulating volume level or messages delivered through that medium, or live pausing of audiovisual material.

In a video conferencing system, eye contact sensors or related eye tracking technologies may be used to ensure that eye contact with a user is captured at all times, by switching to one of multiple cameras positioned behind a virtual display such that the camera closest to which the user is looking is always selected for broadcast. Quality of service of network connection, including resolution of audio and video data can be modulated according to which person is being looked at, as measured by an eye contact sensor or other eye tracking device.

Example 4. Attention Monitor

As an attention monitor, an attentive user interface includes an eye contact sensor, optionally in conjunction with other sensors for measuring other indices of the attentive state of a user, and software to monitor what device, person, or task a user is attending to. This information can be used, for example, to determine the optimal channel of delivering information, prioritize the delivery and notification of messages, appointments, and information from multiple devices or users across a network, and generally manage the user's attention space.

As used herein, the term "attention space" refers to the limited attention a user has available to process/respond to stimuli, given that the capacity of a user to process information simultaneously from various sources is limited.

Software augmented with sensing systems including eye contact sensors function as an intermediary to the management of a user's physical attention. Thus, miniaturized eye contact sensors can be embedded in, and augment, small electronic devices such as PDAs, cell phones, personal entertainment systems, appliances, or any other object to deliver information when a user is paying attention to the device, deferring that information's delivery when the user's attention is directed elsewhere. This information may be used, for example, to dynamically route audio or video calls, instant messages, email messages, or any other communications to the correct location of the user's current attention, and to infer and modulate quality of service of the network.

In environments with many potential subjects requesting a user's attention, attentive user interfaces need a dynamic model of the user's attentive context to establish a gradual and appropriate notification process that does not overload the user. This context includes which task, device, or person the user is paying attention to, the importance of that task, and the preferred communication channel to contact the user. The invention provides a personalized communications server, referred to herein as "eyeREASON", that negotiates all remote interactions between a user and attentive devices by keeping track of the user's attentive context. In one embodiment, eyeREASON is an advanced personal unified messaging filter, not unlike an advanced spam filter. EyeREASON decides, on the basis of information about the user's prior, current, and/or future attentive state, the priority of a message originating from a subject in relationship to that of tasks the user is attending to. By examining parameters of the message and user task(s), including attentive states of subjects pertaining to that message, eyeREASON makes decisions about whether, when, and how to forward notifications to the user, or to defer message delivery for later retrieval by the user. A message can be in any format, such as email, instant messaging or voice connection, speech recognition, or messages from sensors, asynchronous or synchronous. In the embodiment of speech recognition and production interface, any speech communication between a user and device(s) can be routed through a wired or wireless headset worn by the user, and processed by a speech recognition and production system on the server. As the user works with various devices, eyeREASON switches its vocabulary to the lexicon of the focus device, sending commands through that device's in/out (I/O) channels. Each device reports to the eyeREASON server when it senses that a user is paying attention to it. EyeREASON uses this information to determine when and how to relay messages from devices to the user. Using information about the attentive state of the user, such as what devices the user is currently operating, what communication channels with the user are currently occupied, and the priority of the message relative to the tasks the user is engaged in, eyeREASON dynamically chooses an optimal notification device with appropriate channels and levels of notification. Notifications can migrate between devices, tracking the attention of the user, as is illustrated by the below scenario. One application of eyeREASON is the management of prioritized delivery of unified messages.

The following scenario illustrates interactions of a user with various devices enabled with attentive user interfaces, employing eye contact sensing capability, through eyeREASON's attentive reasoning system. It shows how awareness of a user's attentive context may facilitate turn-taking between the user and remote ubiquitous devices. Alex enters his living room, which senses his presence (e.g., via the RF ID tag he is wearing) and reports his presence to his eyeREASON server. He turns on his television, which has live pausing capability (e.g., TiVo, personal video recorder (PVR)). The television is augmented with an attentive user interface having an eye contact sensor, which notifies the server that it is being watched. The eyeREASON server updates the visual and auditory interruption levels of all people present in the living room. Alex goes to the kitchen to get himself a cold drink from his attentive refrigerator, which is augmented with a RF ID tag reader. As he enters the kitchen, his interruption levels are adjusted appropriate to his interactions with devices in the kitchen. In the living room, the TV pauses because its eye contact sensor reports that no one is watching. Alex queries his attentive fridge and finds that there are no cold drinks within. He gets a bottle of soda from a cupboard in the kitchen and puts it in the freezer compartment of the fridge. Informed by a RF ID tag on the bottle, the fridge estimates the amount of time it will take for the bottle to freeze and break. It records Alex's tag and posts a notification with a timed priority level to his eyeREASON server. Alex returns to the living room and looks at the TV, which promptly resumes the program. When the notification times out, Alex's eyeREASON server determines that the TV is an appropriate device to use for notifying Alex. It chooses the visual communication channel, because it is less disruptive than audio. A box with a message from the fridge appears in the corner of the TV. As time progresses, the priority of the notification increases, and the box grows in size on the screen, demonstrating with increased urgency that Alex's drink is freezing. Alex gets up, the TV pauses and he sits down at his computer to check his email. His eyeREASON server determines that the priority of the fridge notification is greater than that of his current email, and moves the alert to his computer. Alex acknowledges this alert, and retrieves his drink, causing the fridge to withdraw the notification. Had Alex not acknowledged this alert, the eyeREASON server would have forwarded the notification to Alex's email, or chosen an alternative channel.

Example 5. Response Monitor

By placing an attentive user interface in the vicinity of any visual material that one would be interested in tracking the response to, such as advertisements (virtual or real), television screens, and billboards, the attention of users for the visual material can be monitored. Applications include, for example, gathering marketing information and monitoring of the effectiveness of advertisements.

Example 6. Control of Graphical User Interface

An attentive user interface, using eye contact sensors or related eye tracking technology, can be used to modulate the amount of screen space allocated to a window in a graphical user interface windowing system according to the amount of visual attention received by that window. Similarly, attentive user interfaces employing eye contact sensors or other related eye tracking technology may be used to initiate the retrieval of information on the basis of progressive disclosure. For example, information may initially be shown with limited resolution on the side of a display. When a user looks at the representation for a set amount of time, more detailed information is retrieved and rendered on the screen using a larger surface. Examples include stock market tickers that grow and provide more information when users pay attention to it, instant messaging buddy status lists that engage in connections, opening up chat boxes with users that are being looked at, etc.

Example 7. Graphical User Interface

This example relates to use of an attentive user interface in a windowing system, referred to herein as "eyeWINDOWS", for a graphical user interface which incorporates fisheye windows or views that use eye fixation, rather than manual pointing, to select the focus window. The windowing system allocates display space to a given window based on the amount of visual attention received by that window. Use of eye input facilitates contextual activity while maintaining user focus. It allows more continuous accommodation of the windowing system to shifts in user attention, and more efficient use of manual input.

Windowing systems of commercial desktop interfaces have experienced little change over the last 20 years. Current systems employ the same basic technique of allocating display space using manually arranged, overlapping windows into the task world. However, due to interruption by for example, system prompts, incoming email messages, and other notifications, a user's attention shifts almost continuously between tasks. Such behavior requires a more flexible windowing systems that allows a user to more easily move between alternate activities. This problem has prompted new research into windowing systems that allow more fluent interaction through, e.g., zooming task bars (Cadiz et al., 2002) or fisheye views (Gutwin, 2002). While most of this work emphasizes the use of manual input for optimizing display space, there has been little work on windowing systems that sense the user's attention using more direct means. Using an alternate channel for sensing the attention of the user for parts of a display has a number of benefits. Firstly, it allows an undisrupted use of manual tools for task-oriented activities; and secondly, it allows a more continuous accommodation of shifts in user attention.

Consider, for example, a scenario where a user is working on a task on a personal computer when an alert window appears on the screen to inform him that a new email message has just been received. The alert window obscures the user's current task and the received message, such that the user is only allowed to resume his task or read the message after manually dismissing the alert. Tracking the focus of a user allows an interface to more actively avoid interrupting the user, e.g., by more careful placement of windows.

Use of eye input to select a window of interest has several advantages. Firstly, the eyes typically acquire a target well before manual pointing is initiated (Zhai, 2003). Secondly, eye muscles operate much faster than hand muscles (Zhai, 2003). Finally, the eyes provide a more continuous signal that frees the hands for other tasks. Bolt (1985) recognized early on how, using a pair of eye tracking glasses, windows might automatically be selected and zoomed. Unfortunately, his glasses did not provide sufficient resolution. However, recent advances allow seamless integration of an eye tracker with a head movement tolerance of 60 cm and an on-screen accuracy of better than 1 cm into a 17" LCD screen. We used a similar eye tracker to implement eyeWINDOWS.

To determine which window should be the focus window, eyeWINDOWS observes user eye fixations at windows with an LC Technologies eye tracker. Using a lens algorithm similar to Sarkar et al. (1992), the focus window is zoomed to maximum magnification. Surrounding windows contract with distance to the focus window. However, the enlarged window does not obscure the surrounding contracted windows, such that the user can readily view all windows. While typical fisheye browsers run within a single window, eyeWINDOWS affects all active applications. Traditional icons are replaced with active thumbnail views that provide full functionality, referred to herein as "eyecons". Eyecons zoom into a focus window when a user looks at them.

Our first design issue was that of when to zoom an eyecon into a focus window. We first experimented with a continuous fisheye lens, which shifted whenever the user produced an eye movement. This led to focus targeting problems similar to those observed during manual pointing (Gutwin, 2002). In subsequent implementations, the lens was shifted only after selecting a new focus window. Our second design issue was how to trigger this selection. We designed two solutions. In our first approach, dwell time was used as a trigger. An eyecon zooms into a focus window after a user-configurable period of fixations at that eyecon. To avoid a Midas Touch effect (Zhai, 2003)—where users avoid looking to prevent unintentional triggering—fisheye magnification is applied with non-linear acceleration. When the user first fixates on an eyecon, it starts growing very slowly. If this is not what the user intended, one fixation at the original focus window undoes the action. However, when the user continues to produce fixations at the eyecon, zooming accelerates until maximum magnification is reached. Our second approach to this problem prevents a Midas Touch effect altogether. In this approach, a new focus window is selected when the user presses the space bar while fixating at an eyecon. Focus window selection is suspended during normal keyboard or pointing activity, such as when scrolling or typing. Fish-eye magnification does not apply to certain utility windows, such as tool bars.

Initial user observations appear to favor the use of key triggering for focus window selection. The following scenario illustrates this process: a user is working on a text in the focus window in the center of the screen. The focus window is surrounded by eyecons of related documents, with associated file names. The user wishes to copy a picture from the document to the right of his focus window. He looks at its eyecon and presses the space bar, and the eyecon zooms into a focus window, while the old focus window shrinks into an eyecon. After having found the picture, he places it in the clipboard and shifts his attention back to the original document. It zooms into a focus window and the user pastes the picture into the document. This scenario illustrates how contextual actions are supported without the need for multiple pointing gestures to resize or reposition windows. EyeWINDOWS also supports more attention-sensitive notification. For example, the user is notified of a message by a notification eyecon at the bottom of the screen. When the user fixates at the notification eyecon it zooms to reveal its message. The notification is dismissed once eyeWINDOWS detects the message was read. This illustrates how an attentive user interface supports user focus within the context of more peripheral events.

Example 8. Attentive Appliance

Any household or commercial/industrial appliance, digital or analog apparatus, or object may be configured as an attentive appliance. Such attentive appliance may be a stand alone "smart appliance", or may be networked to a shared computational resource such as a communications server (e.g., eyeREASON; see Example 4), providing unified message capabilities to all networked appliances without requiring extensive embedded computational support in each appliance. In Example 4 the attentive refrigerator was a refrigerator augmented with the capabilities to sense eye contact with its user, presence of objects inside and outside the fridge through radio frequency ID tags, user identification and presence sensing through RF ID tags or any other means of sensing, as well as identification of objects inside and outside the fridge. A small computer embedded in the fridge, and connected to a network through a tcp ip connection, runs a simple program that allows the fridge to reason about its contents, and interact with the user, by incorporating eye contact with the user. The fridge may contain software for processing and producing speech, and a speech recognition and production engine residing on eyeREASON can advantageously be employed to process speech for it, responding to contextualized verbal queries by a user. This is accomplished by sending xml speech recognition grammars and lexicons from the fridge to eyeREASON that are contextualized upon the state of the fridge's sensing systems. The fridge will send xml grammars and enable speech processing whenever a user is in close proximity to it, and/or making eye contact with the fridge, and/or holding objects from the fridge in his/her hand. The user is connected to the speech recognition and production engine on eyeREASON through a wireless headset (e.g., BlueTooth®). This allows eyeREASON to process speech by the user, with the contextualized grammars provided by the appliance the user is interacting with. EyeREASON determines a) whether speech should be processed; e.g., focus events sent by the appliance on the basis of information from its eye contact sensor; b) for which appliance, and with which grammar speech should be processed; c) what commands should be sent to the appliance as a consequence; and d) what the priority of messages returned from the appliance should be. Messages sent by appliances during synchronous interactions with a user will receive the highest notification levels.

The following scenario illustrates the process: User A is standing near his attentive fridge. He asks what is contained in the fridge while looking at the fridge. The fridge senses his presence, detects eye contact, and determines the identity of the user. It sends an xml grammar containing the speech vocabulary suitable for answering queries to user A's eyeREASON server. The eyeREASON server switches its speech recognition lexicon to process speech for the fridge, as instructed by the current xml grammar. It parses the user's speech according to the grammar, recognizes that the user wants a list of items in the fridge, and sends a command to the fridge to provide a list of items, according the xml specs. The fridge responds by sending a text message to eyeREASON listing the items in the fridge. Since the user is directly engaged in a synchronous interaction with the fridge, eyeREASON decides the message should be forwarded to the user immediately. Since the user has been interacting with the fridge through speech over his headset, eyeREASON uses this same path, speaking the message to the user with its speech production system. The user opens the fridge and retrieves some cheese. The fridge recognizes that the hand of user A is in the fridge, and has removed the cheese. It sends a hand focus event, and subsequently an object focus event to the eyeREASON server with the RF ID of the cheese object, with corresponding grammar for handling any user speech. The user may query any property of the cheese object, for example its expiration date. If the user says "start message" eyeREASON will record any voice message and tag it with the RF ID of the object the user was holding, as well as the ID of the user. It will stop recording when user puts the object back into the fridge, tagging the object with a voice message. It forwards this voice message with a store command to the embedded processor in the fridge. The next time any user other than user A retrieves the same object, the fridge will forward the voice message to pertaining to this object to that user.

Any attentive appliance may signal its attention for a user using, for example, an eye proxy mounted in close proximity to it. The eye proxy (described in more detail above and in Example 2) will function in lieu of an eye contact sensor, tracking and maintaining eye contact with a user. It maintains activation of the speech recognition engine for the appliance it is associated with while there is sufficient statistical evidence the user is looking at or interacting with that appliance. Before replying to a user through a message, the appliance will attempt to signal its request for attention by seeking eye contact between its proxy and user. Should the user not respond, the eyeREASON system will determine a new notification level for the message. EyeREASON will lower the notification level of the message the moment a user is perceived to be no longer interacting directly with the appliance that sent the message. Competing with other messages in the priority queue of the user, the server will either forward the message, for example to the user's cell phone, or store it for later retrieval in the user's message queue. If the priority of the message is determined higher than those of other messages in the user's notification queue, eyeREASON will attempt to progressively notify the user of the message up to a user determined number of times. Each time the user does not respond the notification level of the message is increased. This allows eyeREASON to seek different channels of notification each time the notification is re-triggered. For example, it may initially attempt to signal attention through seeking eye contact with the user through the eye proxy pertaining to the appliance that sent the message. When this fails, it may initiate a low-volume auditory interruption in that appliance. When this fails, it may forward the notification to the appliance the user is currently interacting with, potentially disrupting the user's current activity. The latter should only occur when messages are determined to be of a greater notification level than the user's current tasks. When this fails, the message is forwarded to the user's message queue for later retrieval.

Those of ordinary skill in the art will recognize, or be able to ascertain through routine experimentation, equivalents to the embodiments described herein. Such equivalents are within the scope of the invention and are covered by the appended claims.

REFERENCES

Bolt, R. A., 1985. Conversing with Computers. Technology Review 88(2), pp. 34-43.

Cadiz, J. et al. (2002). Designing and Deploying an Information Awareness Interface. In: Proceedings of CSCW'02.

Frolich, D., et al., 1994. Informal Workplace Communication: What is It Like and How Might We Support It? HP Tech. Report.

Gutwin, C., 2002. Improving Focus Targeting in Interactive Fisheye Views. In: Proceedings of CHI'02, pp. 267-274.

Morimoto, C. et al., 2000. Pupil Detection and Tracking Using Multiple Light Sources. Image and Vision Computing, vol 18.

Sarkar, M. et al., 1992. Graphical Fisheye Views of Graphs. In: Proceedings of CHI'92, pp. 83-91.

Vertegaal, R., 1999. The GAZE Groupware System. In Proceedings of CHI'99. Pittsburgh: ACM.

Zhai, S., 2003. What's in the Eyes for Attentive Input. In: Communications of ACM 46(3).

The invention claimed is:

1. A notification method for a cellular phone, comprising:
embedding at least one camera and at least one processor in the cellular phone for sensing a user's visual attention toward a display screen of the cellular phone;
using the at least one camera to capture at least one image of at least one of the user's pupils;
using the at least one processor to process the at least one image from the camera to determine a glint near the at least one pupil;
using the at least one processor to determine an alignment of the glint relative to the at least one pupil and to determine whether or not the user's visual attention is directed toward the at least one camera based on said alignment, without calibration;
using the user's visual attention directed toward the at least one camera as an indication that the user's visual attention is directed toward the display screen; and
managing when or how to present a notification or message initiated by the cellular phone based on whether the user's visual attention is directed toward the display screen of the cellular phone.

2. The method of claim 1, wherein using the at least one processor to process the at least one image does not require calibration of the user's eye coordinates to x, y display screen coordinates.

3. The method of claim 1, wherein using the at least one processor to process the at least one image comprises:
locating the at least one pupil, a center of the pupil, and the glint in the image;
calculating the distance between the glint and the center of the pupil;
wherein the distance is used to determine whether the pupil center is within a threshold distance of the glint;
wherein when the distance is within the threshold distance is indicative of visual attention of the user toward the display screen of the cellular phone.

4. The method of claim 1, wherein managing when or how to present a notification or message comprises displaying a notification when the user's visual attention toward the display screen of the cellular phone is detected.

5. The method of claim 1, wherein managing when or how to present a notification or message comprises displaying content of a message when the user's visual attention toward the display screen of the cellular phone is detected.

6. The method of claim 1, wherein managing when or how to present a notification or message comprises preventing displaying a notification when the user's visual attention toward the display screen of the cellular phone is not detected.

7. The method of claim 1, wherein managing when or how to present a notification or message comprises preventing displaying content of a message when the user's visual attention toward the display screen of the cellular phone is not detected.

8. The method of claim 1, wherein managing when or how to present a notification or message comprises lowering volume of an auditory notification or preventing an auditory notification when the user's visual attention toward the display screen of the cellular phone is detected.

9. The method of claim 1, wherein managing when or how to present a notification or message comprises raising volume of an auditory notification when the user's visual attention toward the display screen of the cellular phone is not detected.

10. The method of claim 1, wherein managing when or how to present a notification or message comprises selecting an auditory notification in place of a visual notification when the user's visual attention toward the display screen of the cellular phone is not detected.

11. A cellular phone, comprising:
at least one camera embedded in the cellular phone that captures at least one image of at least one of a user's pupils;
a display screen; and
at least one processor;
wherein the at least one processor processes the at least one image and determines a glint near the at least one pupil;
wherein the at least one processor determines an alignment of the glint relative to the at least one pupil and determines whether or not the user's visual attention is directed toward the at least one camera based on said alignment, without calibration;
wherein the user's visual attention directed toward the at least one camera indicates that the user's visual attention is directed toward the display screen; and
wherein the at least one processor manages when or how to present a notification or message initiated by the cellular phone based on whether the user's visual attention is directed toward the display screen of the cellular phone.

12. The cellular phone of claim 11, wherein the at least one camera is a visible light camera.

13. The cellular phone of claim 11, comprising:
an infrared illuminator embedded in the cellular phone that illuminates a field of view of the at least one camera;
wherein the at least one camera is an infrared camera.

14. The cellular phone of claim 11, wherein the glint in the at least one image includes a reflection of an infrared illuminator on a cornea of an eye of the user;
wherein the reflection is used by the at least one processor to determine a location of the glint relative to the at least one pupil without calibration of the user's eye coordinates to x, y display screen coordinates.

15. The cellular phone of claim 14, wherein the at least one processor processes the at least one image by:
locating the pupil, a center of the pupil, and the reflection on the cornea in the image;
calculating a distance between a center of the reflection on the cornea and the center of the pupil;
wherein the distance is used to determine whether the pupil center is within a threshold distance of the reflection on the cornea;

wherein when the distance is within the threshold distance is indicative of the visual attention of the user toward the display screen of the cellular phone.

16. The cellular phone of claim 11, wherein the at least one processor manages when or how to present a notification or message by displaying a notification when the user's visual attention toward the display screen of the cellular phone is detected.

17. The cellular phone of claim 11, wherein the at least one processor manages when or how to present a notification or message by displaying content of a message when the user's visual attention toward the display screen of the cellular phone is detected.

18. The cellular phone of claim 11, wherein the at least one processor manages when or how to present a notification or message by preventing displaying a notification when the user's visual attention toward the display screen of the cellular phone is not detected.

19. The cellular phone of claim 11, wherein the at least one processor manages when or how to present a notification or message by preventing displaying content of a message when the user's visual attention toward the display screen of the cellular phone is not detected.

20. The cellular phone of claim 11, wherein the at least one processor manages when or how to present a notification or message by lowering volume of an auditory notification or preventing an auditory notification when the user's visual attention toward the display screen of the cellular phone is detected.

21. The cellular phone of claim 11, wherein the at least one processor manages when or how to present a notification or message by raising volume of an auditory notification when the user's visual attention toward the display screen of the cellular phone is not detected.

22. The cellular phone of claim 11, wherein the at least one processor manages when or how to present a notification or message by selecting an auditory notification in place of a visual notification when the user's visual attention toward the display screen of the cellular phone is not detected.

* * * * *